US010802509B2

(12) United States Patent
Wang et al.

(10) Patent No.: US 10,802,509 B2
(45) Date of Patent: Oct. 13, 2020

(54) SELECTIVE PROCESSING OF SENSOR DATA

(71) Applicant: SZ DJI TECHNOLOGY CO., LTD., Shenzhen (CN)

(72) Inventors: Tao Wang, Shenzhen (CN); Jiaqi Yan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 105 days.

(21) Appl. No.: 15/691,629

(22) Filed: Aug. 30, 2017

(65) Prior Publication Data

US 2017/0364095 A1   Dec. 21, 2017

Related U.S. Application Data

(63) Continuation of application No. 15/167,154, which is a continuation of application No.
(Continued)

(51) Int. Cl.
*G05D 1/10* (2006.01)
*G06T 7/73* (2017.01)
(Continued)

(52) U.S. Cl.
CPC ........... *G05D 1/101* (2013.01); *B64C 39/024* (2013.01); *B64D 47/08* (2013.01); *G01C 11/34* (2013.01);
(Continued)

(58) Field of Classification Search
None
See application file for complete search history.

(56) References Cited

U.S. PATENT DOCUMENTS 4,926,346 A   5/1990  Yokoyama
4,940,925 A   7/1990  Wand et al.
(Continued)

FOREIGN PATENT DOCUMENTS

CN   101109640 A   1/2008
CN   101109957 A   1/2008
(Continued)

OTHER PUBLICATIONS

The European Patent Office (EPO) European Search Report and Search Opinion Application No. 14909276 dated Mar. 8, 2017.
(Continued)

*Primary Examiner* — Bhavesh V Amin
(74) *Attorney, Agent, or Firm* — Anova Law Group, PLLC

(57) ABSTRACT

Systems and methods for navigating a vehicle within an environment are provided. In one aspect, a method comprises: (a) selecting, with aid of a processor, a subset of a plurality of sensors to be used for navigating the vehicle within the environment based on one or more predetermined criteria, wherein the plurality of sensors are arranged on the vehicle such that each sensor of the plurality of sensors is configured to obtain sensor data from a different field of view; (b) processing, with aid of the processor, the sensor data from the selected sensor(s) so as to generate navigation information for navigating the vehicle within the environment; and (c) outputting, with aid of the processor, signals for controlling the vehicle based on the navigation information.

20 Claims, 14 Drawing Sheets

Related U.S. Application Data

PCT/CN2014/095983, filed on Dec. 31, 2014, now Pat. No. 9,778,661.

(51) Int. Cl.

| | | |
|---|---|---|
| *G06T 7/246* | (2017.01) | |
| *H04N 7/18* | (2006.01) | |
| *G01C 11/34* | (2006.01) | |
| *B64C 39/02* | (2006.01) | |
| *B64D 47/08* | (2006.01) | |
| *G01C 21/20* | (2006.01) | |
| *G06K 9/00* | (2006.01) | |
| *H04N 5/232* | (2006.01) | |
| *H04N 5/243* | (2006.01) | |
| *G06K 9/36* | (2006.01) | |

(52) U.S. Cl.
CPC .......... *G01C 21/20* (2013.01); *G06K 9/0063* (2013.01); *G06T 7/246* (2017.01); *G06T 7/73* (2017.01); *H04N 7/181* (2013.01); *H04N 7/185* (2013.01); *B64C 2201/108* (2013.01); *B64C 2201/126* (2013.01); *B64C 2201/127* (2013.01); *B64C 2201/141* (2013.01); *B64C 2201/146* (2013.01); *G06K 2009/366* (2013.01); *G06T 2207/10032* (2013.01); *G06T 2207/30252* (2013.01); *H04N 5/23238* (2013.01); *H04N 5/243* (2013.01)

(56) References Cited

U.S. PATENT DOCUMENTS

| | | | | |
|---|---|---|---|---|
| 6,404,484 | B1* | 6/2002 | Sogawa | G01C 3/085 356/3.14 |
| 6,593,960 | B1 | 7/2003 | Sugimoto et al. | |
| 6,804,607 | B1 | 10/2004 | Wood | |
| 6,930,593 | B2 | 8/2005 | Crawshaw | |
| 7,299,056 | B2* | 11/2007 | Anderson | G01S 19/48 455/456.1 |
| 7,937,190 | B2* | 5/2011 | Stecko | B64D 39/00 244/135 A |
| 8,164,628 | B2 | 4/2012 | Stein et al. | |
| 8,213,706 | B2 | 7/2012 | Krishnaswamy et al. | |
| 8,305,430 | B2 | 11/2012 | Oskiper et al. | |
| 8,543,265 | B2 | 9/2013 | Ekhaguere et al. | |
| 8,666,661 | B2 | 3/2014 | Higgins | |
| 8,712,679 | B1 | 4/2014 | Mostofi et al. | |
| 8,757,548 | B2* | 6/2014 | Stecko | B64D 39/00 244/135 A |
| 8,818,567 | B2* | 8/2014 | Anderson | G05D 1/0088 701/2 |
| 8,908,573 | B1 | 12/2014 | Wang et al. | |
| 8,909,391 | B1 | 12/2014 | Peeters et al. | |
| 8,996,228 | B1* | 3/2015 | Ferguson | G01C 21/3461 701/28 |
| 9,031,782 | B1 | 5/2015 | Lemay et al. | |
| 9,056,395 | B1* | 6/2015 | Ferguson | G08G 1/09623 |
| 9,135,510 | B2 | 9/2015 | Peynot et al. | |
| 9,318,014 | B1* | 4/2016 | Cheatham | B64D 47/08 |
| 9,843,647 | B2* | 12/2017 | Stenneth | H04Q 9/00 |
| 2003/0031368 | A1 | 2/2003 | Myler et al. | |
| 2004/0119819 | A1 | 6/2004 | Aggarwal et al. | |
| 2004/0133341 | A1* | 7/2004 | Spriggs | G08G 5/0013 701/435 |
| 2004/0162638 | A1* | 8/2004 | Solomon | F41H 13/00 700/247 |
| 2005/0110869 | A1* | 5/2005 | Tillotson | H04N 7/181 348/113 |
| 2005/0115753 | A1* | 6/2005 | Pemberton | B62D 1/28 180/167 |
| 2005/0163346 | A1 | 7/2005 | Van et al. | |
| 2006/0147088 | A1 | 7/2006 | Han et al. | |
| 2006/0147089 | A1 | 7/2006 | Han et al. | |
| 2006/0149417 | A1 | 7/2006 | Han et al. | |
| 2006/0149472 | A1 | 7/2006 | Han et al. | |
| 2006/0189324 | A1* | 8/2006 | Anderson | G01S 19/48 455/456.1 |
| 2007/0093945 | A1* | 4/2007 | Grzywna | G05D 1/101 701/23 |
| 2007/0233361 | A1 | 10/2007 | Shaffer et al. | |
| 2008/0059065 | A1* | 3/2008 | Strelow | G01C 21/005 701/448 |
| 2008/0063270 | A1 | 3/2008 | McClelland et al. | |
| 2008/0065286 | A1 | 3/2008 | Han et al. | |
| 2008/0065287 | A1 | 3/2008 | Han et al. | |
| 2008/0195316 | A1 | 8/2008 | Krishnaswamy | |
| 2008/0263239 | A1 | 10/2008 | Brueggen | |
| 2008/0265097 | A1* | 10/2008 | Stecko | B64D 39/00 244/135 A |
| 2008/0270027 | A1* | 10/2008 | Stecko | B64D 39/00 701/476 |
| 2009/0015674 | A1* | 1/2009 | Alley | G01C 11/025 348/144 |
| 2009/0125223 | A1* | 5/2009 | Higgins | G06T 7/246 701/532 |
| 2009/0248225 | A1* | 10/2009 | Stecko | B64D 39/00 701/3 |
| 2009/0294573 | A1 | 12/2009 | Wilson et al. | |
| 2010/0030417 | A1* | 2/2010 | Fang | G05D 1/0274 701/25 |
| 2010/0063651 | A1* | 3/2010 | Anderson | G05D 1/0088 701/2 |
| 2010/0063672 | A1 | 3/2010 | Anderson | |
| 2010/0183192 | A1 | 7/2010 | Fritsch et al. | |
| 2010/0280699 | A1 | 11/2010 | Bageshwar et al. | |
| 2011/0205256 | A1 | 8/2011 | Matsumoto | |
| 2011/0267452 | A1 | 11/2011 | Notsu et al. | |
| 2011/0311099 | A1 | 12/2011 | Derbanne | |
| 2012/0001058 | A1 | 1/2012 | Luke et al. | |
| 2012/0050524 | A1 | 3/2012 | Rinner et al. | |
| 2012/0078510 | A1 | 3/2012 | Ma et al. | |
| 2012/0155562 | A1 | 6/2012 | Lucidarme | |
| 2012/0173185 | A1* | 7/2012 | Taylor | G01B 11/026 702/104 |
| 2012/0197461 | A1 | 8/2012 | Barrows et al. | |
| 2012/0243775 | A1 | 9/2012 | Ma et al. | |
| 2013/0076862 | A1 | 3/2013 | Ohtomo et al. | |
| 2013/0211659 | A1 | 8/2013 | Peynot et al. | |
| 2013/0317667 | A1* | 11/2013 | Kruglick | B64C 39/024 701/2 |
| 2013/0336174 | A1 | 12/2013 | Rubin et al. | |
| 2014/0032034 | A1 | 1/2014 | Raptopoulos et al. | |
| 2014/0063232 | A1* | 3/2014 | Fairfield | G06K 9/78 348/118 |
| 2014/0067187 | A1* | 3/2014 | Ferguson | B60W 30/00 701/28 |
| 2014/0140575 | A1* | 5/2014 | Wolf | G06K 9/3233 382/103 |
| 2014/0270480 | A1 | 9/2014 | Boardman et al. | |
| 2014/0371973 | A1 | 12/2014 | Pfaff et al. | |
| 2015/0244826 | A1* | 8/2015 | Stenneth | H04Q 9/00 709/213 |
| 2017/0045895 | A1* | 2/2017 | Wang | G05D 1/101 |
| 2017/0318117 | A1* | 11/2017 | Stenneth | H04Q 9/00 |

FOREIGN PATENT DOCUMENTS

| | | |
|---|---|---|
| CN | 101196551 A | 6/2008 |
| CN | 102339062 A | 2/2012 |
| CN | 102819263 A | 12/2012 |
| CN | 103019245 A | 4/2013 |
| CN | 103135551 A | 6/2013 |
| CN | 103149939 A | 6/2013 |
| CN | 103252778 A | 8/2013 |
| CN | 103324196 A | 9/2013 |
| CN | 203299134 U | 11/2013 |
| CN | 103630138 A | 3/2014 |
| CN | 102480593 B | 4/2014 |
| CN | 203950203 U | 11/2014 |
| EP | 1860515 A2 | 11/2007 |

(56) References Cited

FOREIGN PATENT DOCUMENTS

| | | |
|---|---|---|
| EP | 2156255 A1 | 2/2010 |
| JP | S62169516 A | 7/1987 |
| JP | H05327667 A | 12/1993 |
| JP | 2003122394 A | 4/2003 |
| JP | 2011010109 A | 1/2011 |
| JP | 2012173843 A | 9/2012 |
| WO | 02056248 A2 | 7/2002 |
| WO | 2014108026 A1 | 7/2014 |

OTHER PUBLICATIONS

The World Intellectual Property Organization (WIPO) International Search Report and Written Opinion for PCT/CN2014/095983 dated Oct. 10, 2015.

* cited by examiner

| | Frame 1 | Frame 2 | Frame 3 | Frame 4 | Frame 5 | Frame 6 | Frame 7 | Frame 8 | Frame 9 | Frame 10 |
|---|---|---|---|---|---|---|---|---|---|---|
| 1405 | 56 | 51 | 67 | 72 | 52 | 69 | 70 | 53 | 55 | 66 |
| 1410 | 65 | 66 | 79 | 82 | 76 | 62 | 71 | 67 | 66 | 79 |
| 1415 | 49 | 51 | 57 | 63 | 65 | 65 | 70 | 72 | 72 | 77 |

FIG. 11

SELECTIVE PROCESSING OF SENSOR DATA

CROSS-REFERENCE TO RELATED APPLICATION

This application is a continuation application of U.S. patent application Ser. No. 15/167,154, filed on May 27, 2016, which is a continuation application of International Application Serial No. PCT/CN2014/095983, filed Dec. 31, 2014, which is incorporated herein by reference in its entirety.

BACKGROUND

Unmanned vehicles such as unmanned aerial vehicles (UAVs) can be used for performing surveillance, reconnaissance, and exploration tasks in a wide variety of environments for military and civilian applications. A UAV may be manually controlled by a remote user, or may operate in a semi-autonomous or fully autonomous manner. Such UAVs can include sensors configured to collect sensor data from the surrounding environment and processors to calculate and determine information for navigating the UAV from the collected data.

Existing approaches for assessing navigation information may be less than optimal in some instances. For example, the sensor data gathered from a single sensor may be of poor quality. On the other hand, if sensor data from multiple sensors are processed to assess or determine state information, the processing delay of the system may be increased. Sensor data of poor quality or increased processing delays may have a detrimental effect on UAV functions.

SUMMARY

Embodiments disclosed herein provide improved approaches for assessing state information of vehicles such as UAVs within an environment. In many embodiments, a UAV includes a plurality of imaging devices used to collect information regarding the surrounding environment. The data obtained from each of the imaging devices can be processed, e.g., to determine the quality of the image data over a time interval for each imaging device. Based on the quality of the image data, a subset of the imaging device's image data can be selected for processing in order to assess state information of the UAV. Advantageously, the selective processing approaches described herein provide improved accuracy of the assessed state information while conserving computing resources, and can be used to improve UAV functionality in diverse environment types and operating conditions.

Thus, in one aspect, a navigation system is provided. The system comprises a vehicle comprising a plurality of imaging devices each configured to capture a plurality of images; and one or more processors operably coupled to the plurality of imaging devices and individually or collectively configured to: (a) calculate a feature point number in each image of the plurality of images from each imaging device; (b) select at least one of the plurality of imaging devices based on said feature point number; and (c) assess state information for the vehicle using the plurality of images from the selected imaging device(s).

In some embodiments, the vehicle can be an unmanned aerial vehicle. The unmanned aerial vehicle may weigh no more than 10 kg. The maximum dimension of the unmanned aerial vehicle may be no more than 1.5 m. The unmanned aerial vehicle can be configured to fly at a height of no more than 400 m. Optionally, the unmanned aerial vehicle can be configured to detect the presence of a restricted flight region and not fly within a predetermined distance of the restricted flight region. The restricted flight region may be an airport. The unmanned aerial vehicle can be a multi-rotor aircraft.

In some embodiments, the vehicle can comprise one or more propulsion units configured to effect movement of the vehicle. The one or more propulsion units can comprise one or more rotors configured to provide lift to the vehicle.

In some embodiments, the plurality of imaging devices are arranged on the vehicle such that each imaging device of the plurality of imaging devices is configured to capture the plurality of images from a different field of view. In some embodiments, the plurality of imaging devices can comprise at least three imaging devices. Alternatively, the plurality of imaging devices can comprise at least four imaging devices. The plurality of imaging devices can be each oriented in a different direction relative to the vehicle. The different directions can be orthogonal directions. Alternatively, or in combination, the different directions can comprise at least four different directions. At least one of the different directions can be substantially along a direction of motion of the vehicle. The plurality of imaging devices can be located at three or more of the following locations: a front side, rear side, left side, right side, upper side, or lower side of the vehicle.

In some embodiments, the plurality of images can comprise a plurality of successive image frames captured over a predetermined time interval. The predetermined time interval can be within a range from about 0.02 seconds to about 0.1 seconds.

In some embodiments, the feature point number in each image can be indicative of saliency of said image. The feature point number in each image can be calculated using a corner detection algorithm. The corner detection algorithm can be a Features from Accelerated Segment Test (FAST) algorithm.

In some embodiments, step (b) can comprise assessing whether said feature point number exceeds a predetermined threshold.

In some embodiments, the state information can comprise at least one of a position, an attitude, a velocity, or an acceleration of the vehicle. The attitude can comprise at least one of a roll orientation, a pitch orientation, or a yaw orientation of the vehicle.

In some embodiments, the one or more processors can further be configured to: (d) output control signals for effecting movement of the vehicle based on the state information.

In some embodiments, the steps (a)-(c) can be repeated during operation of the vehicle. The steps (a)-(c) can be repeated about once every 0.02 seconds to about once every 0.1 seconds.

In another aspect, a method for assessing state information of a moving vehicle attached to a plurality of imaging devices is provided. The method comprises: (a) capturing a plurality of images with each imaging device of the plurality of imaging devices; (b) calculating, with aid of a processor, a feature point number in each image of the plurality of images from each imaging device; (c) selecting, with aid of the processor, at least one of the plurality of imaging devices based on said feature point number; and (d) assessing, with aid of the processor, state information for the vehicle using the plurality of images from the selected imaging device(s).

In some embodiments, the vehicle can be an unmanned aerial vehicle. The unmanned aerial vehicle may weigh no more than 10 kg. The maximum dimension of the unmanned aerial vehicle may be no more than 1.5 m. The unmanned aerial vehicle can be configured to fly at a height of no more than 400 m. Optionally, the unmanned aerial vehicle can be configured to detect the presence of a restricted flight region and not fly within a predetermined distance of the restricted flight region. The restricted flight region may be an airport. The unmanned aerial vehicle can be a multi-rotor aircraft.

In some embodiments, the vehicle can comprise one or more propulsion units configured to effect movement of the vehicle. The one or more propulsion units can comprise one or more rotors configured to provide lift to the vehicle.

In some embodiments, the plurality of imaging devices are arranged on the vehicle such that each of the plurality of images is captured from a different field of view. In some embodiments, the plurality of imaging devices can comprise at least three imaging devices. Alternatively, the plurality of imaging devices can comprise at least four imaging devices. The plurality of imaging devices can be each oriented in a different direction relative to the vehicle. The different directions can be orthogonal directions. Alternatively, or in combination, the different directions can comprise at least four different directions. At least one of the different directions can be substantially along a direction of motion of the vehicle. The plurality of imaging devices can be located at three or more of the following locations: a front side, rear side, left side, right side, upper side, or lower side of the vehicle.

In some embodiments, the plurality of images can comprise a plurality of successive image frames captured over a predetermined time interval. The predetermined time interval can be within a range from about 0.02 seconds to about 0.1 seconds.

In some embodiments, the feature point number in each image can be indicative of saliency of said image. The feature point number in each image can be calculated using a corner detection algorithm. The corner detection algorithm can be a Features from Accelerated Segment Test (FAST) algorithm.

In some embodiments, step (c) can comprise assessing whether said feature point number exceeds a predetermined threshold.

In some embodiments, the state information can comprise at least one of a position, an attitude, a velocity, or an acceleration of the vehicle. The attitude can comprise at least one of a roll orientation, a pitch orientation, or a yaw orientation of the vehicle.

In some embodiments, the method can further comprise outputting control signals for effecting movement of the vehicle based on the state information.

In some embodiments, the steps (a)-(d) can be repeated during operation of the vehicle. The steps (a)-(d) can be repeated about once every 0.02 seconds to about once every 0.1 seconds.

In another aspect, a navigation system is provided. The system comprises: a vehicle comprising one or more propulsion units configured to effect movement of the vehicle and a plurality of imaging each configured to capture a plurality of images; and one or more processors operably coupled to the plurality of imaging devices and individually or collectively configured to: (a) assess image quality of the plurality of images from each imaging device; (b) select at least one of the plurality of imaging devices based on the assessment of step (a); and (c) assess state information for the vehicle using the plurality of images from the selected imaging device(s). In some embodiments, the one or more processors are further configured to: (d) output control signals to the one or more propulsion units for effecting the movement of the vehicle, based on the state information.

In some embodiments, the vehicle can be an unmanned aerial vehicle. The unmanned aerial vehicle may weigh no more than 10 kg. The maximum dimension of the unmanned aerial vehicle may be no more than 1.5 m. The unmanned aerial vehicle can be configured to fly at a height of no more than 400 m. Optionally, the unmanned aerial vehicle can be configured to detect the presence of a restricted flight region and not fly within a predetermined distance of the restricted flight region. The restricted flight region may be an airport. The unmanned aerial vehicle can be a multi-rotor aircraft.

In some embodiments, the one or more propulsion units can comprise one or more rotors configured to provide lift to the vehicle.

In some embodiments, the plurality of imaging devices are arranged on the vehicle such that each imaging device of the plurality of imaging devices is configured to capture the plurality of images from a different field of view. In some embodiments, the plurality of imaging devices can comprise at least three imaging devices. Alternatively, the plurality of imaging devices can comprise at least four imaging devices. The plurality of imaging devices can be each oriented in a different direction relative to the vehicle. The different directions can be orthogonal directions. Alternatively or in combination, the different directions can comprise at least four different directions. At least one of the different directions can be substantially along a direction of motion of the vehicle. The plurality of imaging devices can be located at three or more of the following locations: a front side, rear side, left side, right side, upper side, or lower side of the vehicle.

In some embodiments, the plurality of images can comprise a plurality of successive image frames captured over a predetermined time interval. The predetermined time interval can be within a range from about 0.02 seconds to about 0.1 seconds.

In some embodiments, the image quality can be based on a feature point number in each image of said plurality of images. The feature point number in each image can be calculated using a corner detection algorithm. The corner detection algorithm can be a Features from Accelerated Segmented Test (FAST) algorithm. The image quality can be based on saliency of each image of said plurality of images. The image quality can be based on at least one of an exposure level or contrast level in each image of said plurality of images. The image quality can be based on suitability of said plurality of images for use in assessing the state information for the vehicle.

In some embodiments, step (a) can comprise assessing whether the image quality of said plurality of images exceeds a predetermined threshold. Step (a) can comprise identifying which of the plurality of images has the highest image quality.

In some embodiments, the state information can comprise at least one of a position, an attitude, a velocity, or an acceleration of the vehicle. The attitude comprises at least one of a roll orientation, a pitch orientation, or a yaw orientation of the vehicle.

In some embodiments, steps (a)-(c) can be repeated during operation of the vehicle. The steps (a)-(c) can be repeated about once every 0.02 seconds to about once every 0.1 seconds.

In another aspect, a method for controlling a moving vehicle attached to a plurality of imaging devices is provided. The method comprises: (a) capturing a plurality of images with each imaging device of the plurality of imaging devices; (b) assessing, with aid of a processor, image quality of the plurality of images from each imaging device; (c) selecting, with aid of the processor, at least one of the plurality of imaging devices based on the assessment of step (b); and (d) assessing, with aid of the processor, state information for the vehicle using the plurality of images from the selected imaging device(s). In some embodiments, the method further comprises: (e) outputting, with aid of the processor, control signals to one or more propulsion units mounted on the vehicle for effecting movement of the vehicle, based on the state information.

In some embodiments, the vehicle can be an unmanned aerial vehicle. The unmanned aerial vehicle may weigh no more than 10 kg. The maximum dimension of the unmanned aerial vehicle may be no more than 1.5 m. The unmanned aerial vehicle can be configured to fly at a height of no more than 400 m. Optionally, the unmanned aerial vehicle can be configured to detect the presence of a restricted flight region and not fly within a predetermined distance of the restricted flight region. The restricted flight region may be an airport. The unmanned aerial vehicle can be a multi-rotor aircraft.

In some embodiments, the one or more propulsion units can comprise one or more rotors configured to provide lift to the vehicle.

In some embodiments, the plurality of imaging devices are arranged on the vehicle such that each of the plurality of images is captured from a different field of view. In some embodiments, the plurality of imaging devices can comprise at least three imaging devices. Alternatively, the plurality of imaging devices can comprise at least four imaging devices.

In some embodiments, the plurality of imaging devices can be each oriented in a different direction relative to the vehicle. The different directions can be orthogonal directions. Alternatively, or in combination, the different directions can comprise at least four different directions. At least one of the different directions can be substantially along a direction of motion of the vehicle. The plurality of imaging devices can be located at three or more of the following locations: a front side, rear side, left side, right side, upper side, or lower side of the vehicle.

In some embodiments, the plurality of images can comprise a plurality of successive image frames captured over a predetermined time interval. The predetermined time interval can be within a range from about 0.02 seconds to about 0.1 seconds.

In some embodiments, the image quality can be based on a feature point number in each image of said plurality of images. The feature point number in each image can be calculated using a corner detection algorithm. The corner detection algorithm can be a Features from Accelerated Segmented Test (FAST) algorithm. The image quality can be based on saliency of each image of said plurality of images. The image quality can be based on at least one of an exposure level or contrast level in each image of said plurality of images. The image quality can be based on suitability of said plurality of images for use in assessing the state information for the vehicle.

In some embodiments, step (b) can comprise assessing whether the image quality of said plurality of images exceeds a predetermined threshold.

In some embodiments, step (b) can comprise identifying which of the plurality of images has the highest image quality.

In some embodiments, the state information can comprise at least one of a position, an attitude, a velocity, or an acceleration of the vehicle. The attitude comprises at least one of a roll orientation, a pitch orientation, or a yaw orientation of the vehicle.

In some embodiments, steps (a)-(d) can be repeated during operation of the vehicle. The steps (a)-(d) can be repeated about once every 0.02 seconds to about once every 0.1 seconds.

In another aspect, a navigation system is provided. The system comprises: a vehicle comprising a plurality of imaging devices each configured to capture a plurality of images, wherein the plurality of imaging devices comprise a primary imaging device and one or more secondary imaging devices; and one or more processors operably coupled to the plurality of imaging devices and individually or collectively configured to: (a) assess image quality of the plurality of images from the primary imaging device to determine whether said image quality meets a predetermined threshold; (b) assess image quality of the plurality of images from the one or more secondary imaging devices if the image quality of step (a) does not meet the predetermined threshold; (c) select at least one of the one or more secondary imaging devices based on the assessment of step (b); and (d) assess state information for the vehicle using the plurality of images from the selected secondary imaging device(s).

In some embodiments, the vehicle can be an unmanned aerial vehicle. The unmanned aerial vehicle may weigh no more than 10 kg. The maximum dimension of the unmanned aerial vehicle may be no more than 1.5 m. The unmanned aerial vehicle can be configured to fly at a height of no more than 400 m. Optionally, the unmanned aerial vehicle can be configured to detect the presence of a restricted flight region and not fly within a predetermined distance of the restricted flight region. The restricted flight region may be an airport. The unmanned aerial vehicle can be a multi-rotor aircraft.

In some embodiments, the one or more propulsion units can comprise one or more rotors configured to provide lift to the vehicle.

In some embodiments, the plurality of imaging devices are arranged on the vehicle such that each imaging device of the plurality of imaging devices is configured to capture the plurality of images from a different field of view. In some embodiments, the plurality of imaging devices can comprise at least three imaging devices. Alternatively, the plurality of imaging devices can comprise at least four imaging devices. The plurality of imaging devices can be each oriented in a different direction relative to the vehicle. The different directions can be orthogonal directions. Alternatively or in combination, the different directions can comprise at least four different directions. The primary imaging device can be oriented substantially along a direction of motion of the vehicle. The plurality of imaging devices can be located at three or more of the following locations: a front side, rear side, left side, right side, upper side, or lower side of the vehicle.

In some embodiments, the plurality of images can comprise a plurality of successive image frames captured over a predetermined time interval. The predetermined time interval can be within a range from about 0.02 seconds to about 0.1 seconds.

In some embodiments, the image quality of steps (a) and (b) can be each based on a feature point number in each image of said plurality of images. The feature point number in each image can be calculated using a corner detection algorithm. The corner detection algorithm can be a Features from Accelerated Segmented Test (FAST) algorithm.

In some embodiments, the image quality of steps (a) and (b) can be each based on saliency of each image of said plurality of images. The image quality of steps (a) and (b) can be each based on at least one of an exposure level or contrast level in each image of said plurality of images. The image quality of steps (a) and (b) can be each based on suitability of said plurality of images for use in assessing the state information for the vehicle.

In some embodiments, step (b) can comprise assessing whether the image quality of said plurality of images exceeds a second predetermined threshold. Step (b) can comprise identifying which of said plurality of images has the highest image quality.

In some embodiments, the state information can comprise at least one of a position, an attitude, a velocity, or an acceleration of the vehicle. The attitude can comprise at least one of a roll orientation, a pitch orientation, or a yaw orientation of the vehicle.

In some embodiments, steps (a)-(d) can be repeated during operation of the vehicle. The steps (a)-(d) can be repeated about once every 0.02 seconds to about once every 0.1 seconds.

In another aspect, a method for assessing state information of a moving vehicle attached to a plurality of imaging devices is provided. The method comprises: (a) capturing a plurality of images with each imaging device of the plurality of imaging devices, and wherein the plurality of imaging devices comprises a primary imaging device and one or more secondary imaging devices; (b) assessing, with aid of a processor, image quality of the plurality of images from the primary imaging device to determine whether said image quality meets a predetermined threshold; (c) assessing, with aid of the processor, image quality of the plurality of images from the one or more secondary imaging device if the image quality of step (b) does not meet the predetermined threshold; (d) selecting, with aid of the processor, at least one of the one or more secondary imaging devices based on the assessment of step (c); and (e) assessing, with aid of the processor, state information for the vehicle using the plurality of images from the selected secondary imaging device(s).

In some embodiments, the vehicle can be an unmanned aerial vehicle. The unmanned aerial vehicle may weigh no more than 10 kg. The maximum dimension of the unmanned aerial vehicle may be no more than 1.5 m. The unmanned aerial vehicle can be configured to fly at a height of no more than 400 m. Optionally, the unmanned aerial vehicle can be configured to detect the presence of a restricted flight region and not fly within a predetermined distance of the restricted flight region. The restricted flight region may be an airport. The unmanned aerial vehicle can be a multi-rotor aircraft.

In some embodiments, the one or more propulsion units can comprise one or more rotors configured to provide lift to the vehicle.

In some embodiments, the plurality of imaging devices are arranged on the vehicle such that each of the plurality of images is captured from a different field of view. In some embodiments, the plurality of imaging devices can comprise at least three imaging devices. The plurality of imaging devices can comprise at least four imaging devices. The plurality of imaging devices can be each oriented in a different direction relative to the vehicle. The different directions can be orthogonal directions. Alternatively or in combination, the different directions can comprise at least four different directions. The primary imaging device can be oriented substantially along a direction of motion of the vehicle. The plurality of imaging devices can be located at three or more of the following locations: a front side, rear side, left side, right side, upper side, or lower side of the vehicle.

In some embodiments, the plurality of images can comprise a plurality of successive image frames captured over a predetermined time interval. The predetermined time interval can be within a range from about 0.02 seconds to about 0.1 seconds.

In some embodiments, the image quality of steps (b) and (c) can be each based on a feature point number in each image of said plurality of images. The feature point number in each image can be calculated using a corner detection algorithm. The corner detection algorithm can be a Features from Accelerated Segmented Test (FAST) algorithm.

In some embodiments, the image quality of steps (b) and (c) can be each based on saliency of each image of said plurality of images. The image quality of steps (b) and (c) can be each based on at least one of an exposure level or contrast level in each image of said plurality of images. The image quality of steps (b) and (c) can be each based on suitability of said plurality of images for use in assessing the state information for the vehicle.

In some embodiments, step (c) can comprise assessing whether the image quality of said plurality of images exceeds a second predetermined threshold. Step (c) can comprise identifying which of said plurality of images has the highest image quality.

In some embodiments, the state information can comprise at least one of a position, an attitude, a velocity, or an acceleration of the vehicle. The attitude can comprise at least one of a roll orientation, a pitch orientation, or a yaw orientation of the vehicle.

In some embodiments, steps (a)-(e) can be repeated during operation of the vehicle. The steps (a)-(e) can be repeated about once every 0.02 seconds to about once every 0.1 seconds.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Furthermore, any description herein of a rotor or rotor assembly may apply to and be used for any propulsion system, device, or mechanism configured to generate a propulsive force by rotation (e.g., propellers, wheels, axles).

In another aspect, a system for navigating a vehicle within an environment is provided. The system comprises a vehicle comprising a plurality of sensors arranged on the vehicle such that each sensor of the plurality of sensors is configured to obtain sensor data from a different field of view; one or more processors operably coupled to the plurality of sensors and individually or collectively configured to: (a) select a subset of the plurality of sensors to be used for navigating the vehicle within the environment based on one or more predetermined criteria; (b) process the sensor data from the selected sensor(s) so as to generate navigation information for navigating the vehicle within the environment; and (c) output signals for controlling the vehicle based on the navigation information.

In some embodiments, the subset is selected by at least assessing each sensor to determine if said sensor meets the one or more predetermined criteria and selecting said sensor if said sensor meets the one or more predetermined criteria. The one or more predetermined criteria can comprise whether said sensor is oriented substantially along a direction of motion of the vehicle. The one or more predetermined criteria can comprise whether quality of the sensor data obtained by said sensor exceeds a predetermined threshold. The one or more predetermined criteria can comprise whether said sensor has the highest sensor data quality of the plurality of sensors. The one or more predetermined criteria can comprise whether power consumption of said sensor is below a predetermined threshold. The one or more predetermined criteria can comprise whether said sensor has the lowest power consumption of the plurality of sensors.

In some embodiments, the number of sensors in the subset varies based on a direction of motion of the vehicle. The number of sensors in the subset can vary based on environmental complexity of the environment.

In some embodiments, the vehicle is an unmanned aerial vehicle. The vehicle can comprise one or more propulsion units configured to effect movement of the vehicle. The one or more propulsion units comprise one or more rotors configured to provide lift to the vehicle.

In some embodiments, the plurality of sensors comprises a plurality of different sensor types. The plurality of sensors can comprise one or more of: an imaging device, an ultrasonic sensor, a lidar sensor, or a radar sensor. The plurality of sensors can comprise at least three sensors or at least four sensors. Each sensor can be oriented in a different direction relative to the vehicle. The different directions can be orthogonal directions. The different directions can comprise at least four different directions. At least one of the different directions can be substantially along a direction of motion of the vehicle.

In some embodiments, the plurality of sensors are located at three or more of the following locations: a front side, rear side, left side, right side, upper side, or lower side of the vehicle.

In some embodiments, the navigation information comprises state information for the vehicle. 3 The state information can comprise at least one of a position, an attitude, a velocity, or an acceleration of the vehicle. The attitude can comprise at least one of a roll orientation, a pitch orientation, or a yaw orientation of the vehicle.

In some embodiments, the navigation information comprises environmental information for the environment. The environmental information can comprise locations of one or more obstacles in the environment. The signals can cause the vehicle to avoid the one or more obstacles.

In another aspect, a method for navigating a vehicle within an environment is provided. The method comprises: (a) selecting, with aid of a processor, a subset of a plurality of sensors to be used for navigating the vehicle within the environment based on one or more predetermined criteria, wherein the plurality of sensors are arranged on the vehicle such that each sensor of the plurality of sensors is configured to obtain sensor data from a different field of view; (b) processing, with aid of the processor, the sensor data from the selected sensor(s) so as to generate navigation information for navigating the vehicle within the environment; and (c) outputting, with aid of the processor, signals for controlling the vehicle based on the navigation information.

In some embodiments, selecting the subset comprises assessing each sensor to determine if said sensor meets the one or more predetermined criteria and selecting said sensor if said sensor meets the one or more predetermined criteria. The one or more predetermined criteria can comprise whether said sensor is oriented substantially along a direction of motion of the vehicle. The one or more predetermined criteria can comprise whether quality of the sensor data obtained by said sensor exceeds a predetermined threshold. The one or more predetermined criteria can comprise whether said sensor has the highest sensor data quality of the plurality of sensors. The one or more predetermined criteria can comprise whether power consumption of said sensor is below a predetermined threshold. The one or more predetermined criteria can comprise whether said sensor has the lowest power consumption of the plurality of sensors.

In some embodiments, the number of sensors in the subset varies based on a direction of motion of the vehicle. The number of sensors in the subset can vary based on environmental complexity of the environment.

In some embodiments, the vehicle is an unmanned aerial vehicle. The vehicle can comprise one or more propulsion units configured to effect movement of the vehicle. The one or more propulsion units comprise one or more rotors configured to provide lift to the vehicle.

In some embodiments, the plurality of sensors comprises a plurality of different sensor types. The plurality of sensors can comprise one or more of: an imaging device, an ultrasonic sensor, a lidar sensor, or a radar sensor. The plurality of sensors can comprise at least three sensors or at least four sensors. Each sensor can be oriented in a different direction relative to the vehicle. The different directions can be orthogonal directions. The different directions can comprise at least four different directions. At least one of the different directions can be substantially along a direction of motion of the vehicle.

In some embodiments, the plurality of sensors are located at three or more of the following locations: a front side, rear side, left side, right side, upper side, or lower side of the vehicle.

In some embodiments, the navigation information comprises state information for the vehicle. The state information can comprise at least one of a position, an attitude, a velocity, or an acceleration of the vehicle. The attitude can comprise at least one of a roll orientation, a pitch orientation, or a yaw orientation of the vehicle.

In some embodiments, the navigation information comprises environmental information for the environment. The environmental information can comprise locations of one or more obstacles in the environment. The signals can cause the vehicle to avoid the one or more obstacles.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 11 illustrates exemplary feature point numbers for three image sequences obtained by three secondary imaging devices, in accordance with embodiments;

DETAILED DESCRIPTION

Figure 1:
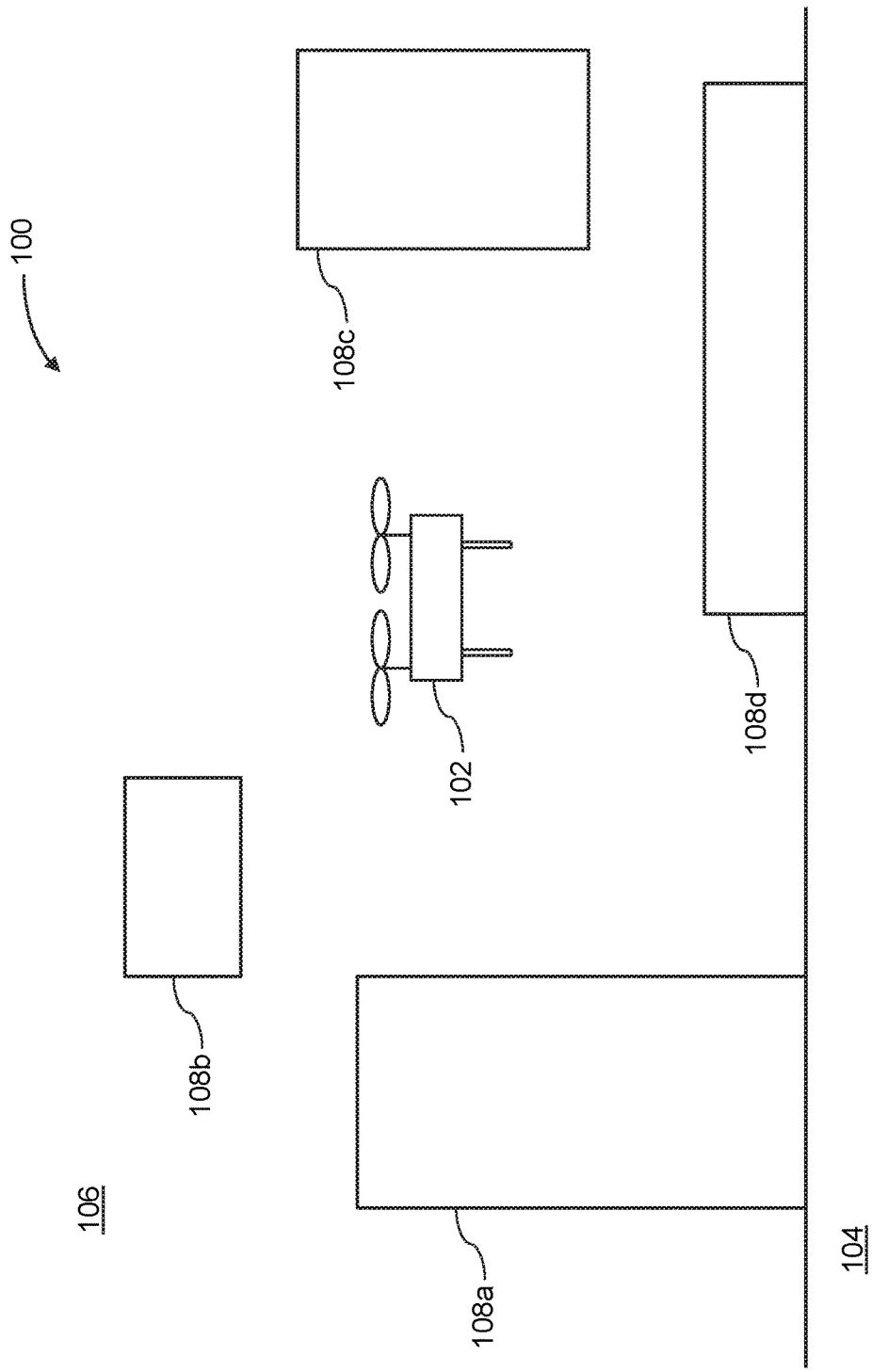
FIG. 1 illustrates a UAV operating in an outdoor environment, in accordance with embodiments.

The present disclosure provides navigation systems and methods for assessing state information of vehicles, such as an unmanned aerial vehicle (UAV). In some embodiments, the UAV can be adapted to carry a plurality of sensors configured to collect environmental data. In some embodiments, the sensors may comprise imaging devices such as cameras. The approaches described herein can involve using more than one imaging device to obtain a plurality of images with differing fields of view. In some embodiments, the quality of image frames taken by the plurality of imaging devices may be compared over a time interval to determine a primary imaging device with the highest quality image sequence for that period of time. A processor may process information from only the image frames taken by the primary imaging device to determine or assess the state for the UAV. This approach may be advantageous for providing accurate and reliable state information in situations where it is difficult for a single imaging device to obtain high quality images over a period of time. Processing images for state information from only images captured by the primary imaging device may reduce processing time and delay, and reduce computer resources that are necessary. The use of multiple imaging devices for collecting environmental data as disclosed herein can improve the accuracy of determination of state information for the UAV even in diverse environments and operating conditions, thereby enhancing the robustness and flexibility of UAV functionalities such as navigation and obstacle avoidance.

The embodiments provided herein can be applied to various types of vehicles, such as UAVs. For instance, the UAV may be a small-scale UAV that weighs no more than 10 kg and/or has a maximum dimension of no more than 1.5 m. In some embodiments, the UAV may be a rotorcraft, such as a multi-rotor aircraft that is propelled to move through the air by a plurality of propellers (e.g., a quadcopter). Additional examples of UAVs, other vehicles, and other movable objects suitable for use with the embodiments presented herein are described in further detail below.

The UAVs described herein can be operated completely autonomously (e.g., by a suitable computing system such as an onboard controller), semi-autonomously, or manually (e.g., by a human user). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), move to target location or to a sequence of target locations, hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.). For instance, some commands can be used to control the position, orientation, and/or operation of a UAV payload such as a camera. Optionally, the UAV can be configured to operate in accordance with one or more predetermined operating rules. The operating rules may be used to control any suitable aspect of the UAV, such as the position (e.g., latitude, longitude, altitude), orientation (e.g., roll, pitch yaw), velocity (e.g., translational and/or angular), and/or acceleration (e.g., translational and/or angular) of the UAV. For instance, the operating rules can be designed such that the UAV is not permitted to fly beyond a threshold height, e.g., the UAV can be configured to fly at a height of no more than 400 m from the ground. In some embodiments, the operating rules can be adapted to provide automated mechanisms for improving UAV safety and preventing safety incidents. For example, the UAV can be configured to detect a restricted flight region (e.g., an airport) and not fly within a predetermined distance of the restricted flight region, thereby averting potential collisions with aircraft and other obstacles.

FIG. 1 illustrates a UAV 102 operating in an outdoor environment 100, in accordance with embodiments. The outdoor environment 100 may be an urban, suburban, or rural setting, or any other environment that is not at least partially within a building. The UAV 102 may be operated relatively close to the ground 104 (e.g., low altitude) or relatively far from the ground 104 (e.g., high altitude). For example, a UAV 102 operating less than or equal to approximately 10 m from the ground may be considered to be at low altitude, while a UAV 102 operating at greater than or equal to approximately 10 m from the ground may be considered to be at high altitude.

In some embodiments, the outdoor environment 100 includes one or more obstacles 108a-d. An obstacle may include any object or entity that may obstruct the movement of the UAV 102. Some obstacles may be situated on the ground 104 (e.g., obstacles 108a, 108d), such as buildings, ground vehicles (e.g., cars, motorcycles, trucks, bicycles), human beings, animals, plants (e.g., trees, bushes), and other manmade or natural structures. Some obstacles may be in contact with and/or supported by the ground 104, water, manmade structures, or natural structures. Alternatively, some obstacles may be wholly located in the air 106 (e.g., obstacles 108b, 108c), including aerial vehicles (e.g., airplanes, helicopters, hot air balloons, other UAVs) or birds. Aerial obstacles may not be supported by the ground 104, or by water, or by any natural or manmade structures. An obstacle located on the ground 104 may include portions that extend substantially into the air 106 (e.g., tall structures such as towers, skyscrapers, lamp posts, radio towers, power lines, trees, etc.).

Figure 2:
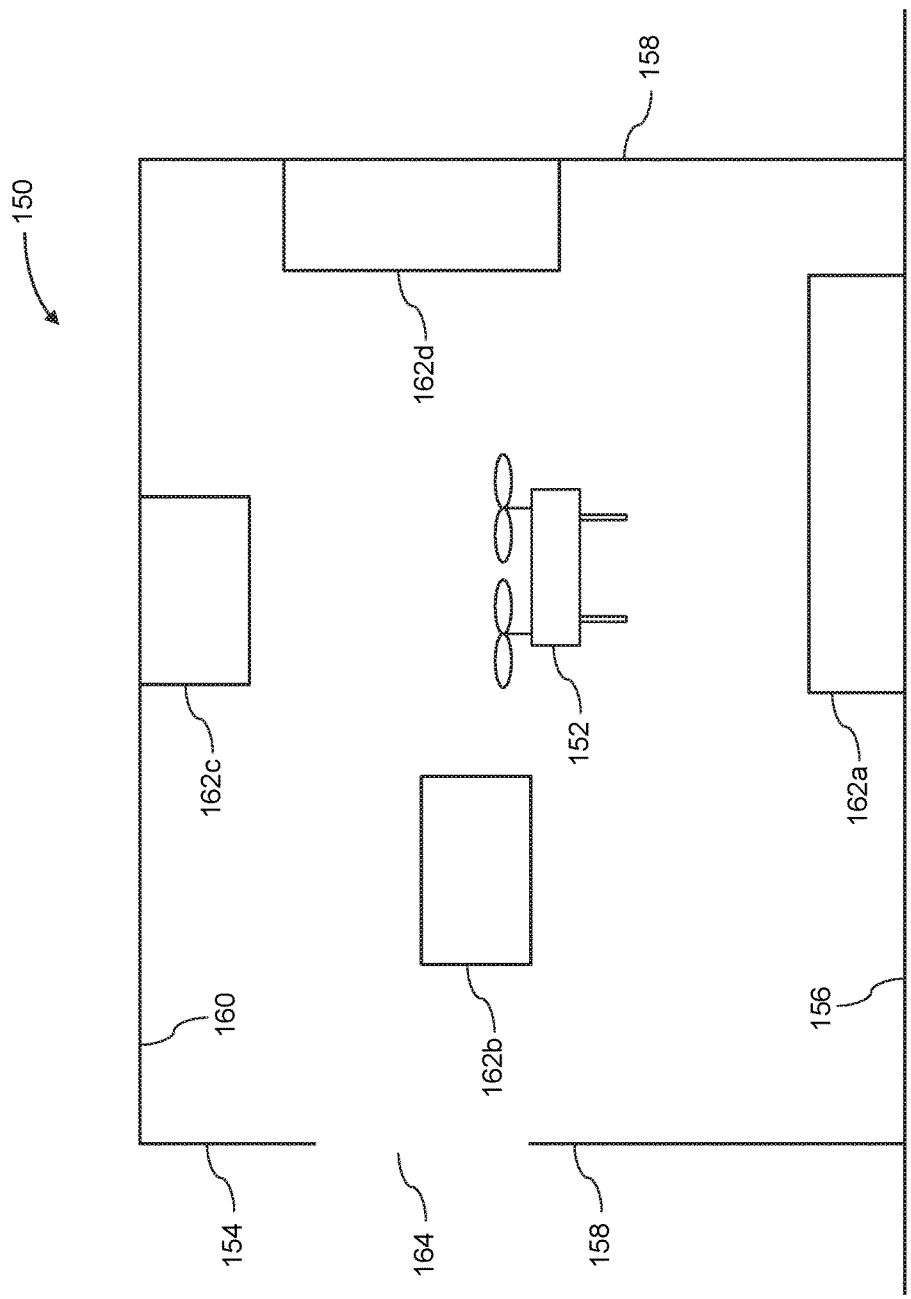
FIG. 2 illustrates a UAV operating in an indoor environment, in accordance with embodiments.

FIG. 2 illustrates a UAV 152 operating in an indoor environment 150, in accordance with embodiments. The indoor environment 150 is within the interior of a building 154 having a floor 156, one or more walls 158, and/or a ceiling or roof 160. Exemplary buildings include residential, commercial, or industrial buildings such as houses, apartments, offices, manufacturing facilities, storage facilities, and so on. The interior of the building 154 may be completely enclosed by the floor 156, walls 158, and ceiling 160 such that the UAV 152 is constrained to the interior space. Conversely, at least one of the floor 156, walls 158, or ceiling 160 may be absent, thereby enabling the UAV 152 to fly from inside to outside, or vice-versa. Alternatively or in combination, one or more apertures 164 may be formed in the floor 156, walls 158, or ceiling 160 (e.g., a door, window, skylight).

Similar to the outdoor environment 100, the indoor environment 150 can include one or more obstacles 162a-d. Some obstacles may be situated on the floor 156 (e.g., obstacle 162a), such as furniture, appliances, human beings, animals, plants, and other manmade or natural objects. Conversely, some obstacles may be located in the air (e.g., obstacle 162b), such as birds or other UAVs. Some obstacles in the indoor environment 150 can be supported by other structures or objects. Obstacles may also be attached to the ceiling 160 (e.g., obstacle 162c), such as light fixtures, ceiling fans, beams, or other ceiling-mounted appliances or structures. In some embodiments, obstacles may be attached to the walls 158 (e.g., obstacle 162d), such as light fixtures, shelves, cabinets, and other wall-mounted appliances or structures. Notably, the structural components of the building 154 can also be considered to be obstacles, including the floor 156, walls 158, and ceiling 160.

The obstacles described herein may be substantially stationary (e.g., buildings, plants, structures) or substantially mobile (e.g., human beings, animals, vehicles, or other objects capable of movement). Some obstacles may include a combination of stationary and mobile components (e.g., a windmill). Mobile obstacles or obstacle components may move according to a predetermined or predictable path or pattern. For example, the movement of a car may be relatively predictable (e.g., according to the shape of the road). Alternatively, some mobile obstacles or obstacle components may move along random or otherwise unpredictable trajectories. For example, a living being such as an animal may move in a relatively unpredictable manner.

In order to ensure safe and efficient operation, it may be beneficial to provide the UAV with mechanisms for assessing environmental information such as the locations of objects in the surrounding environment and/or UAV state information such as position, velocity, attitude, and acceleration. Additionally, accurate assessment of environmental and/or state information can facilitate navigation, particularly when the UAV is operating in a semi-autonomous or fully autonomous manner and can be valuable for a wide variety of UAV functionalities.

Accordingly, the UAVs described herein can include one or more sensors configured to collect sensor data that can be processed to obtain navigation information for navigating the UAV. Navigation information can include information relating to the UAV state, the surrounding environment, or the objects within the environment. Based on the sensor data that is collected, it can be possible to generate control signals for controlling UAV navigation. Exemplary sensors suitable for use with the embodiments disclosed herein include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras, radar), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, six, seven, eight, or more sensors. Optionally, the data can be received from sensors of different types (e.g., two, three, four, five, six, seven, eight, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). In some instances, the local coordinate system may be a body coordinate system that is defined relative to the UAV.

The sensors can be configured to collect various types of sensor data useful for navigation, such as data relating to the UAV, the surrounding environment, or objects within the environment. The sensor data can be processed (e.g., by one or more processors) so as to obtain navigation information, such as state information or environmental information. For example, at least some of the sensors may be configured to provide data regarding a state of the UAV and the sensor data obtained by such sensors can be processed to obtain state information for the UAV. The state information provided by a sensor can include information regarding a spatial disposition of the UAV (e.g., location or position information such as longitude, latitude, and/or altitude; orientation or attitude information such as roll, pitch, and/or yaw). The state information can also include information regarding motion of the UAV (e.g., translational velocity, translation acceleration, angular velocity, angular acceleration, etc.). A sensor can be configured, for instance, to determine a spatial disposition and/or motion of the UAV with respect to up to six degrees of freedom (e.g., three degrees of freedom in position and/or translation, three degrees of freedom in orientation and/or rotation). The state information may be provided relative to a global coordinate system or relative to a local coordinate system (e.g., relative to the UAV or another entity). For example, a sensor can be configured to determine the distance between the UAV and the user controlling the UAV, or the distance between the UAV and the starting point of flight for the UAV.

Alternatively or in addition, the data obtained by the sensors may be processed to provide various types of environmental information. For example, the sensor data may be indicative of an environment type, such as an indoor environment, outdoor environment, low altitude environment, or high altitude environment. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as the obstacles described herein. Obstacle information may include information regarding the number, density, geometry, and/or location of one or more obstacles in the environment.

In some embodiments, the environmental information can include information regarding the complexity of the surrounding environment. "Environmental complexity" may be used herein to refer to the extent to which an environment is occupied by obstacles. The environmental complexity may be a quantitative or qualitative measure. In some embodiments, the environmental complexity is determined based on one or more of: the number of obstacles, the volume or percentage of space occupied by obstacles, the volume or percentage of space within a certain proximity to the UAV occupied by obstacles, the volume or percentage of space unobstructed by obstacles, the volume or percentage of space within a certain proximity to the UAV unobstructed by obstacles, the proximity of obstacles to the UAV, the obstacle density (e.g., number of obstacles per unit space), the types of obstacles (e.g., stationary or mobile), the spatial disposition of obstacles (e.g., position, orientation), the motion of obstacles (e.g., velocity, acceleration), and so on. For instance, an environment having a relatively high obstacle density would have high environmental complexity (e.g., indoor environment, urban environment), whereas an environment having a relatively low obstacle density would have low environmental complexity (e.g., high altitude environment). As another example, an environment in which a large percentage of space is occupied by obstacles would have a higher complexity, whereas an environment having a large percentage of unobstructed space would have a lower complexity.

In some embodiments, the navigation information obtained from processing the sensor data is used to generate signals for controlling various aspects of UAV navigation, such as movement, obstacle avoidance, environmental mapping, and so on. The signals can be output to various UAV components, e.g., propulsion units, to effect UAV navigation within an environment. In some embodiments, such navigation can occur autonomously or semi-autonomously, such that little or no user input is required to control the UAV.

In order to optimize the navigation of the UAV within an environment, it may be beneficial to optimize the accuracy of the navigation information used as a basis for controlling the UAV. The accuracy of the navigation information may depend upon the accuracy, reliability, and quality of the sensor data used to generate the navigation information. In some instances, a single sensor may not be capable of providing satisfactory sensor data for UAV operation at all times, e.g., due to device failure, suboptimal sensor data quality, limitations in sensor field of view, etc. Accordingly, in order to ensure that the obtained sensor data is satisfactory for navigation purposes, it can be beneficial to provide multiple sensors on the UAV for navigation purposes, e.g., to provide redundancy, increase the amount of available data for processing, and compensate for failure or inaccuracies in any single sensor.

Figure 3:
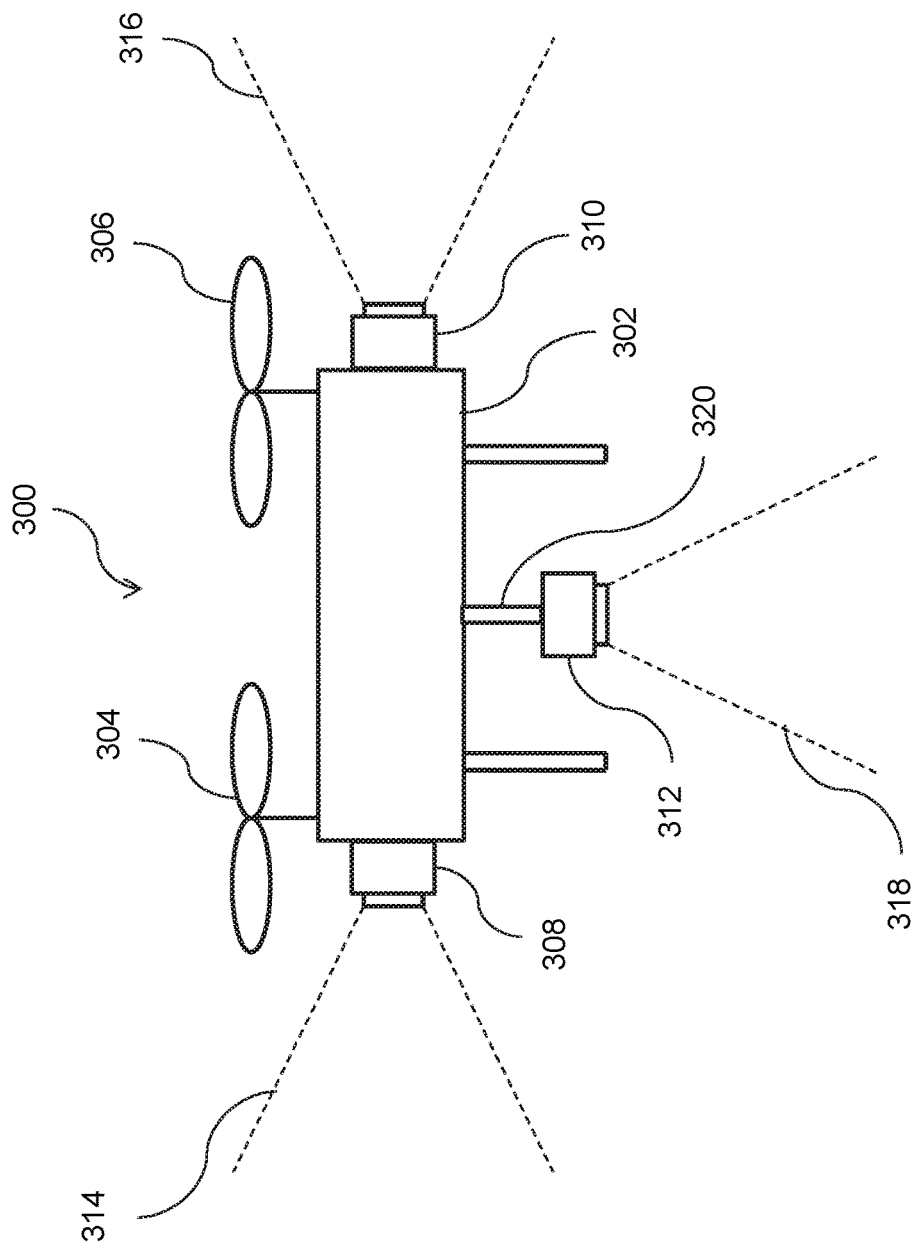
FIG. 3 illustrates a UAV coupled with multiple sensors, in accordance with embodiments.

FIG. 3 illustrates a UAV 300 coupled with multiple sensors 308, 310, and 312, in accordance with embodiments. The UAV 300 can include a vehicle body 302. Propulsion units 304, 306 can be coupled to the vehicle body 302. The UAV 300 can include one or more sensors coupled to the body 302, such as sensors 308, 310, 312. Each sensor can have a different field of view 314, 316, 318. In the embodiment of FIG. 3, the sensors 308, 310 are coupled to the sides of the body 302, while the sensor 312 is connected to the vehicle body 302 by a carrier 320 (e.g., a gimbal). While FIG. 3 shows sensors that are coupled to the sides and connected to the vehicle body by a carrier, it is to be understood that sensors of the present disclosure can be situated on any suitable portion of the UAV, such as above, underneath, on the side(s) of, or within a vehicle body of the UAV. Some sensors can be mechanically coupled to the UAV such that the spatial disposition and/or motion of the UAV correspond to the spatial disposition and/or motion of the sensor. The sensors can be coupled to the UAV via a rigid coupling, such that the sensor does not move relative to the portion of the UAV to which it is attached. Alternatively, the coupling between the sensor and the UAV can permit movement (e.g., translational or rotational movement relative to the UAV) of the sensor relative to the UAV. The coupling can be a permanent coupling or non-permanent (e.g., releasable) coupling. Suitable coupling methods can include adhesives, bonding, welding, and/or fasteners (e.g., screws, nails, pins, etc.). Optionally, the sensor can be integrally formed with a portion of the UAV. Furthermore, the sensor can be electrically coupled with a portion of the UAV (e.g., processing unit, control system, data storage) so as to enable the data collected by the sensor to be used for various functions of the UAV (e.g., navigation, control, propulsion, communication with a user or other device, etc.), such as the embodiments discussed herein. The sensor may be operably coupled with a portion of the UAV (e.g., processing unit, control system, data storage).

Although FIG. 3 depicts a UAV with three sensors, it shall be understood that the embodiments described herein can be applied to any suitable number of sensors, such as one, two, three, four, five, six, seven, eight or more sensors. In some embodiments, the UAV includes at least one, at least two, at least three, at least four, at least five, at least six, at least seven, or at least eight sensors. The sensors may each be pointing in different directions. The sensors can be positioned and oriented relative to each other and to the UAV as desired. In some embodiments, sensors may be positioned near each other. Alternatively, some may be positioned away from each other. The sensors may be positioned on opposite sides of the vehicle, on adjacent sides of the vehicle, on the same side of the vehicle, on same portion of the vehicle, or on different portions of the vehicle. For example, each sensor can be mounted on a different side or surface of the UAV (e.g., front, rear, left, right, top (upper side), and/or bottom (lower side) surfaces). In some embodiments, some or all of the sensors are mounted on one or more carriers attached to the UAV. In some embodiments, the plurality of sensors can be located at three or more different sides or surfaces of the UAV (e.g., front, rear, left, right, upper, lower sides of the vehicle).

The sensors can be situated at different positions and orientations such that the field of view of each sensor is different. The field of view of a sensor may be the extent of the environment that is detectable (e.g., visible) by the sensor. Sensors with different fields of view may depict different portions of the surrounding environment. The fields of view of some or all of the sensors may overlap. Alternatively, the fields of view of the sensors may not overlap. The fields of view between two sensors may overlap but be different (e.g., only partially overlapping). The field of view may be related to the angle of view, which may be measured by the angular extent of a given scene that is imaged by the sensor. The angle of view of an sensor may be at an angle of less than or about 360°, 300°, 270°, 240°, 180°, 120°, 90°, 60°, 45°, 30°, 20°, 10°, 5°, or 1°. The angle of view of each sensor may be different. Alternatively, the angle of view of some or all of the sensors may be the same.

In some embodiments, the directionality of a sensor with optical components (e.g., vision sensors such as cameras) can be characterized by the directionality of its optical axis. A plurality of sensors can be situated at different positions and orientations such that their respective optical axes are different. The optical axis of a sensor, which may also be referred to as the "principal axis," can be a line along which there is some degree of rotational symmetry in the sensor. In some embodiments, the optical axis of the sensor passes through the center of the optical components (e.g., lens, photo sensor) of the sensor. In some embodiments, the sensors may be arranged such that their respective optical axes are at an angle of about 10°, 20°, 30°, 40°, 50°, 60°, 70°, 80°, 90°, 100°, 110°, 120°, 130°, 140°, 150°, 160°, 170°, or 180° relative to one another. In some embodiments, the sensors may be spaced evenly apart (e.g., two devices are 180° apart, three devices are 120° apart, four devices are 90° apart, etc). In some embodiments, the sensors may be orthogonally oriented with respect to one another. Alternatively or in combination, at least one of the sensors may be oriented along the direction of motion of the UAV. The optical axis may be the axis from which the angle of view is measured. The angle of view may be measured vertically, horizontally, or diagonally along the optical axis.

Figure 4:
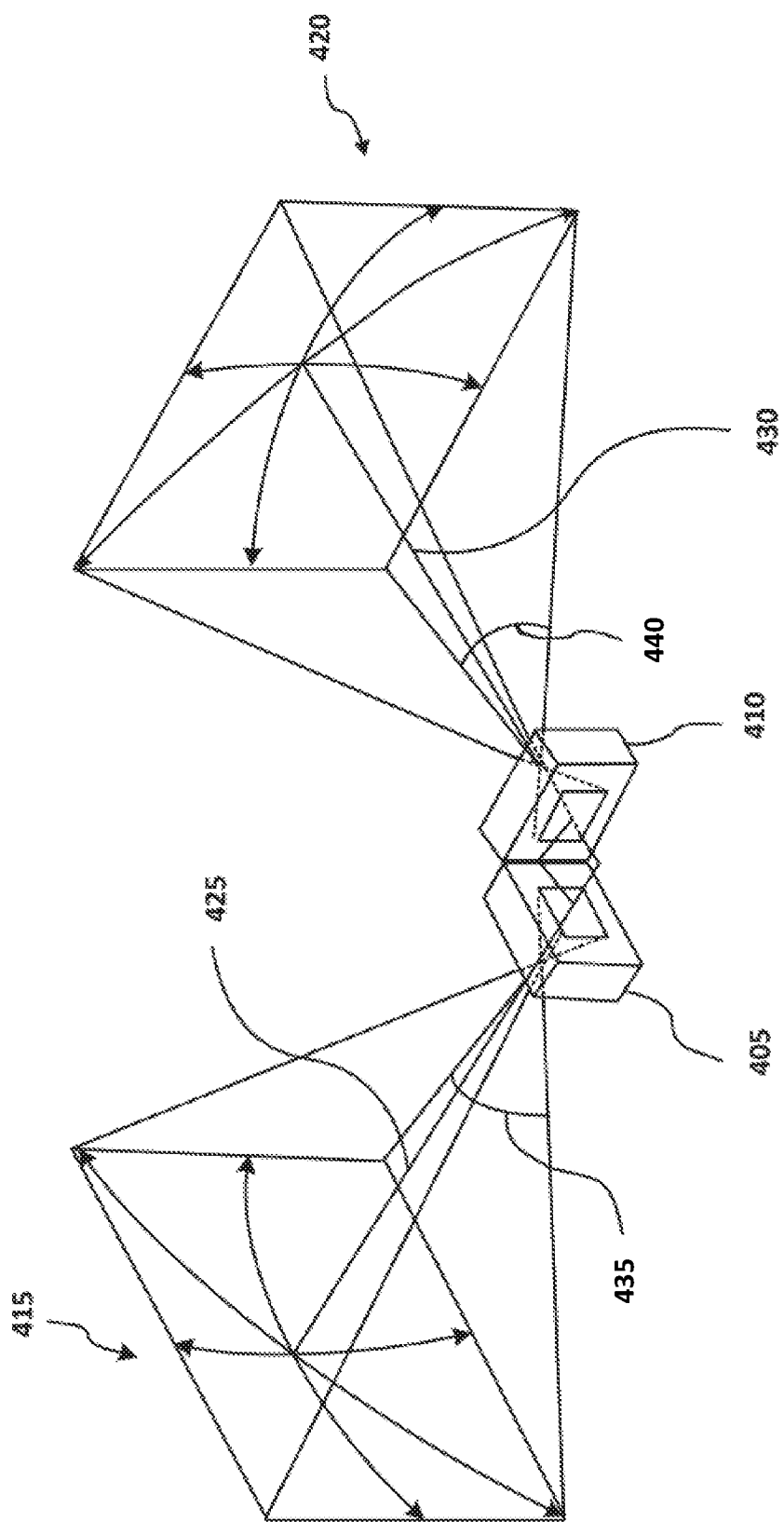
FIG. 4 illustrates sensors with different fields of view, in accordance with embodiments.

FIG. 4 illustrates two sensors 405, 410 positioned near with different fields of view 415, 420, in accordance with embodiments. In some embodiments, the sensors 405, 410 are cameras. Sensor 405 is obtaining sensor data with a field of view 415 and sensor 410 is obtaining sensor data with a field of view 420. In the embodiment of FIG. 4, the fields of view 415, 420 are different and do not overlap. In some embodiments, the angles of view 435, 440 of the sensors 405, 410 measured horizontally are about 60°. The sensor 405 can have an optical axis 425 that is at a 90° angle relative to the optical axis 430 of sensor 410. In alternative embodiments, the fields of view 415, 420, angles of view 435, 440, and/or optical axes 425, 430 can be varied as desired.

The sensors carried on a UAV (or other movable object) may all be of the same type. Alternatively, at least some of the sensors may be of different types. In some embodiments, the sensors each provide sensor data of the same scene from different positions and/or orientations. The sensors can be configured to capture sensor data of a scene at the same time or approximately the same time. Alternatively, some sensors can be configured to capture sensor data at different times than other sensors.

As previously described herein, the use of multiple sensors for collecting sensor data can improve the accuracy of navigation information in some instances. However, in certain situations, processing sensor data from multiple sensors may require more processing power, processing time, and/or computing resources than is ideal. For example, small-scale UAVs (e.g., weighing less than 10 kg) and other small movable objects may not be capable of carrying sufficient processors, memory, and/or other types of computing resources to enable processing of multiple sensor data sets at a sufficient speed for navigation purposes.

Accordingly, in some embodiments, selective processing of sensor data is used to conserve processing power and computing resources and reduce processing time. In such embodiments, only a subset of the sensors carried by the UAV are used to provide sensor data for generating navigation information. The subset of sensors can be selected based on one or more predetermined criteria so as to optimize the accuracy of the resultant navigation information, as well as to improve overall UAV performance (e.g., reduce power consumption, processor load, calculation complexity). This approach can improve the speed and efficiency of sensor data processing while maintaining improved accuracy and reliability of navigation information.

Figure 5:
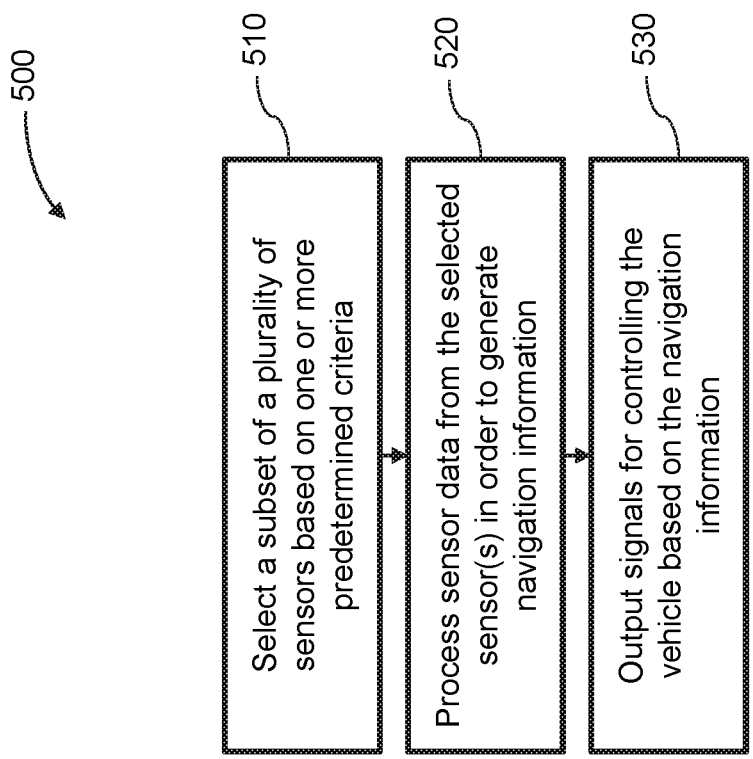
FIG. 5 illustrates a method for navigating a vehicle within an environment, in accordance with embodiments.

FIG. 5 illustrates a method 500 for navigating a vehicle within an environment, in accordance with embodiments. The method 500 can be applied to control a vehicle such as a UAV carrying a plurality of sensors (e.g., imaging devices, ultrasonic sensors, lidar sensors, radar sensors, or combinations thereof). Optionally, the sensors can be arranged on the vehicle such that each sensor obtains respective sensor data from a different field of view. At least some of the fields of view may overlap with each other. In some embodiments, at least some of the fields of view are different. In other embodiments, at least some of the fields of view are the same. Some or all of the steps of the method 500 can be performed by one or more processors that are operably coupled to the plurality of sensors. In some embodiments, the method 500 is performed without requiring user input, thereby enabling autonomous selection and processing of sensor data for generating navigation information.

In step 510, a subset of a plurality of sensors carried by the vehicle is selected, based on one or more predetermined criteria. The subset can include any number of sensors, such as at least one, two, three, four, five, or more sensors. In some embodiments, the subset is less than all of the sensors carried by the vehicle for navigation. In some embodiments, the subset includes only a single sensor. The number of sensors to be selected for the subset can vary based on certain factors. For example, the number of sensors in the subset can vary based on the characteristics of the surrounding environment, such as the environmental complexity. A larger number of sensors can be selected when the vehicle is operating within an environment that is relatively complex (e.g., high obstacle density), whereas a smaller number of sensors can be selected when the vehicle is operating within an environment that is not complex (e.g., low obstacle density). It may be beneficial to select a larger number of sensors when navigating within highly complex environments in order to provide additional redundancy and accuracy of the sensor data and reduce the risk of accidents (e.g., collisions with obstacles). In some embodiments, at least 2, 3, 4, 5, or more sensors are selected when the vehicle is operating within a highly complex environment.

As another example, the number of sensors selected as part of the subset can vary based on the state of the vehicle, such as the direction and/or the speed of motion of the vehicle. In some embodiments, a single sensor is selected if the direction of motion is one-dimensional (e.g., relative to orthogonal coordinate axes of the vehicle reference frame), two sensors are selected if the direction of motion is two-dimensional, and three sensors are selected if the direction of motion is three-dimensional. For example, a single sensor can be selected when the sensor is aligned with the direction of motion, two sensors can be selected when the sensors are oblique to the direction of motion but still within the same plane of motion, and three sensors can be selected when the sensors are oblique to the direction of motion and outside the plane of motion. The alignment of the sensors relative to the direction of motion can be determined according to the field of view, angle of view, and/or optical axis of the sensors, as previously described herein.

Various types of predetermined criteria can be used to select sensors. For example, the criteria can be related to the orientation and/or field of view of the sensor, e.g., whether the sensor is oriented substantially along the direction of motion of the vehicle, whether the field of view of the sensor overlaps the direction of motion, etc. As another example, the criteria can be related to the quality of the sensor data produced by the sensor (e.g., signal to noise ratio, suitability for processing, accuracy, robustness, reliability), such as whether the quality exceeds a predetermined threshold, whether the sensor has the highest sensor data quality, etc. In some embodiments, the sensor data from each sensor is analyzed to determine the quality and only the sensors producing the highest quality data are selected. In yet another example, the criteria can be related to the power consumption of each sensor, e.g., whether the power consumption is below a predetermined threshold, whether the sensor has the lowest power consumption, etc. In some embodiments, sensors exhibiting lower power consumption are preferentially selected before sensors exhibiting higher power consumption. The one or more predetermined criteria can be provided in various ways, such as preset or preprogrammed in the UAV prior to operation, transmitted to the UAV during operation, determined based on user input before or during operation, or combinations thereof. In some embodiments, the step 510 involves assessing each sensor to determine if it meets the one or more predetermined criteria, and selecting the sensor if it does meet the criteria.

In step 520, sensor data from the selected sensor(s) is processed in order to generate navigation information for navigating the vehicle within the environment. As previously described herein, the sensor data can be processed to obtain state information for the vehicle and/or environmental information for the environment. In some embodiments, the navigation information is determined using only the sensor data from the selected sensor(s), such that sensor data from the remaining sensors is not processed. This selective processing approach can improve the processing efficiency and speed for determining navigation information, as previously described herein.

In step 530, signals for controlling the vehicle are output based on the navigation information generated in step 530. The signals can be configured for controlling navigation of the vehicle within the environment. In some embodiments, the signals include control signals for the propulsion units of the vehicle in order to control the spatial disposition and/or movement of the vehicle. For example, environmental information regarding the location of one or more obstacles can be used to generate control signals to cause the vehicle to move in a manner that avoids the obstacles. In another example, state information regarding a current velocity of the vehicle can be used as feedback to adjust the operation of the propulsion units in order to ensure that the vehicle achieves and maintains a desired velocity.

In some embodiments, the approaches described herein can be applied to selective processing of image data obtained by vision sensors, also referred to herein as "imaging devices." An imaging device can be configured to detect electromagnetic radiation (e.g., visible, infrared, and/or ultraviolet light) and generate image data based on the detected electromagnetic radiation. For example, an imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). Although certain embodiments provided herein are described in the context of imaging devices, it shall be understood that the present disclosure can be applied to any suitable type of sensor, and vice-versa.

In some embodiments, the imaging device can be a camera. A camera can be a movie or video camera that captures dynamic image data (e.g., video). A camera can be a still camera that captures static images (e.g., photographs). Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene.

The images obtained by the imaging devices described herein can be used for a variety of applications related to UAV operation. In some embodiments, the images are used to facilitate UAV navigation within an environment (e.g., autonomously, semi-autonomously, or manually). For example, the images can be processed to determine state information for the UAV (e.g., position, orientation, velocity, and/or acceleration information). Alternatively or in addition, the images can be processed to determine environmental information (e.g., complexity, location of obstacles). Any description herein referring to state information can also be applied to other types of navigation information such as environmental information, and vice-versa. The state information can be determined using images obtained by a single imaging device. Alternatively, the state information can be determined using images obtained from multiple imaging devices.

In some embodiments, the imaging devices described herein are configured to capture a plurality of images that are processed in order to determine the state information. A plurality of images taken by an imaging device may be referred to herein as an image sequence, or sequence of images. An individual image captured by the imaging device may be referred to herein as an "image frame." An image sequence can include one or more image frames. The sequence of images can be captured at a specific capture rate. In some embodiments, the image frames may be captured standard video frame rates such as about 24p, 25p, 30p, 48p, 50p, 60p, 72p, 90p, 100p, 120p, 300p, 50i, or 60i. In some embodiments, the image frames may be captured at a rate less than or equal to about once every 0.0001 seconds, 0.0002 seconds, 0.0005 seconds, 0.001 seconds, 0.002 seconds, 0.005 seconds, 0.002 seconds, 0.05 seconds, 0.01 seconds, 0.02 seconds, 0.05 seconds, 0.1 seconds, 0.2 seconds, 0.5 seconds, 1 second, 2 seconds, 5 seconds, or 10 seconds. In some embodiments, the capture rate may change depending on user input, state information, or external conditions (e.g. rain, snow, wind, unobvious surface texture of environment).

The sequence of images may be captured over a time interval. In some embodiments, the image sequence, or plurality of images, may comprise a plurality of successive image frames captured over a predetermined time interval. The time interval can be set as desired by a user. The time interval may be fixed. Alternatively, the time interval may be automatically determined, e.g., by a processor. The time interval may remain fixed or may change during the course of operation of the UAV or its components (e.g., imaging devices). In some embodiments, the time interval may be less than or equal to about 0.005 seconds, 0.002 seconds, 0.05 seconds, 0.01 seconds, 0.02 seconds, 0.05 seconds, 0.1 seconds, 0.2 seconds, 0.5 seconds, 1 second, 2 seconds, 5 seconds, 10 seconds, 20 seconds, 50 seconds, 100 seconds, 200 seconds, 500 seconds, 1000 seconds, or 3600 seconds. In some embodiments, the time interval may be within a range from about 0.02 seconds to about 0.1 seconds. In some embodiments, the time interval may change depending on user input, state information, or external conditions. The imaging devices may capture said sequence of images for any duration. In some embodiments, duration can be the time during which the UAV is operational, the time during which the UAV is moving, time as set by the user, time as automatically determined by a processor, time as preset, the time during which user input is given, the time during which there is instability (e.g. turbulence, drift), or depending on state information.

In some embodiments, the image sequences captured by the imaging devices can be processed to detect one or more feature points present in each image of the plurality of images from each imaging device. A feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture). A feature point may be detected in portions of an image that are stable under perturbations (e.g., when varying illumination and brightness of an image). Feature detection as described herein can be accomplished using various algorithms which may extract one or more feature points from image data and calculate the total number of feature points, or "feature point number." The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and calculate a feature point number using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof.

State information can be assessed according to the extracted features using one or more processors. In some embodiments, a processor may comprise a field-programmable gate array (FPGA), application-specific integrated circuit (ASIC), application-specific standard product (ASSP), or complex programmable logic devices (CPLD). In some embodiments, the processor may be an embedded processor carried by the UAV. Alternatively, the processor may be separated from the UAV (e.g., at a ground station, communicating with the UAV). In some embodiments, the processor can take the extracted feature points and compare them across a sequence of image frames in order to track and map objects and determine the relative changes over the image frames. In some embodiments, the processor can determine state information of the UAV such as position (e.g. longitude, latitude, and altitude), attitude, orientation (e.g., roll, pitch, and yaw), velocity (e.g. translational and angular velocity), and acceleration (e.g. translational and angular acceleration) by analyzing the relative changes over the image frames based on the feature points.

Figure 6:
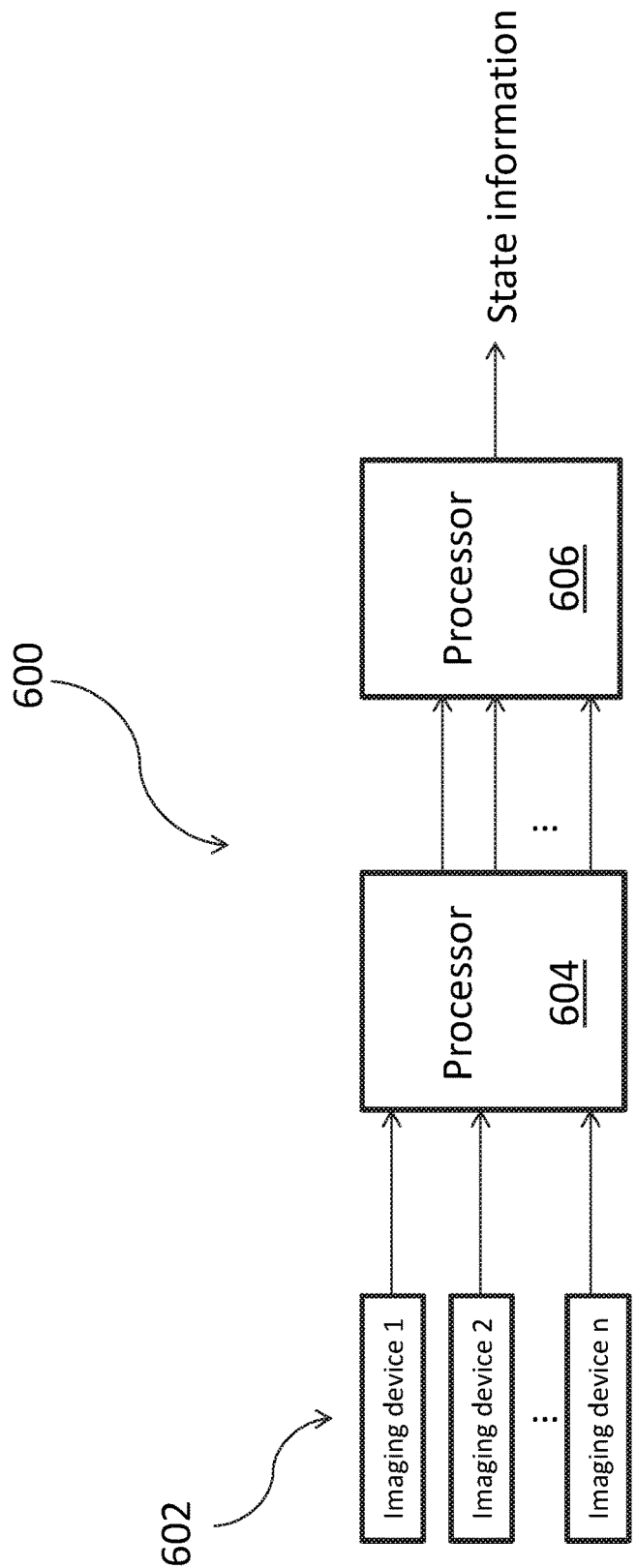
FIG. 6 illustrates a system for processing state information of a UAV using images from a plurality of imaging devices, in accordance with embodiments.

FIG. 6 illustrates a system 600 for processing state information of a UAV using images from a plurality of imaging devices 602, in accordance with embodiments. The system 600 can include a plurality of imaging devices 602, a first processor 604, and a second processor 606. Each of the imaging devices 602 can be used to capture an image sequence. The image sequences captured by the imaging devices 602 can be sent to the first processor 604 (e.g., an FPGA) which processes the image sequences in order to detect feature points in each of the images, e.g., using the algorithms described above. In some embodiments, the processor 604 determines a plurality of feature points from each of the images in the image sequences, calculates a feature point number, and uses the feature point number to assess or determine image quality, as described in further detail herein. The feature points for each of the image sequences can be transmitted to the second processor 606 (e.g., an embedded processor). The processor 606 can process the image sequences further to assess the state information of the UAV. Optionally, the processor 606 can determine the state information using the feature points of the image sequences generated by the processor 604, as previously described herein. The state information can be output to a flight control module of the UAV and used as a basis for outputting control signals to effect movement of the UAV. For example, the control signals can be output to the one or more propulsion units mounted on the UAV. Although the system 600 is depicted as including two separate processors 604, 606 for detecting feature points and assessing state information, any suitable number and combination of processors can be used. For example, a single processor can be used to perform feature point detection and state information determination. In some embodiments, at least some of the processors may be carried by the UAV. In some embodiments, at least some of the processors may be separate from the UAV (e.g., at a ground station communicating with the UAV). There may be one or more processors for detecting the feature points and assessing the state information. The feature points and state information can be determined by different processors, or by the same processors.

The accuracy and robustness of the state information determined from images may depend on the image quality of the images. In some embodiments, image quality refers to the suitability of the image frame(s) for image processing (e.g., to assess UAV state information). Poor quality images not suitable for processing may provide inaccurate data while high quality images suitable for processing may provide accurate data. Image quality may be related to or dependent on the image saliency. Image saliency can be used herein to refer to the extent to which images have features that are easily distinguishable or "stand out," e.g., from the background and/or surrounding image pixels. Any description herein referring to image quality may also be applied to image saliency, and vice-versa. In some embodiments, image quality can be determined by the exposure level and/or contrast of the image. In some embodiments, image quality may be determined using image gradient methods in which a gradient for each pixel in the image can be calculated and the results can be used to determine whether the image texture is sufficiently rich. An image with a richer texture may have larger gradients which may signify a higher quality image. In some embodiments, image quality is assessed by feature detection, as previously described herein. For instance, the image quality can be related to the number of feature points detected in the image. In some embodiments, the number of features points in an image is assessed and identified in order to determine the image quality. In some embodiments, the feature point number in each image can be indicative of saliency of the image. A high number of feature points can signify a high quality image suited to be used in assessing state information while a low number of feature points can signify a low quality image not suited to be used in assessing state information. For example, a high quality image may have at least about 100, 150, 200, 250, 500, 1000 or more feature points. Conversely, a low quality image may have less than about 100, 75, 60, 50, 25, or fewer feature points.

In some embodiments, some or all of the image frames captured by a single imaging device may be of relatively poor image quality, e.g., due to suboptimal imaging conditions. Imaging devices may not be able to provide satisfactory image data in certain situations, e.g., when the lighting is bright or has high contrast, or in adverse environmental conditions such as rain, fog, or smog. Poor image quality can result when images depict repetitive environments (e.g., walls, water), environments with low contrast (e.g., snow, nighttime), overexposure, underexposure, and/or unobvious surface texture. Moreover, even if the initial sequence of images taken by an imaging device were of good quality, subsequent images taken by the imaging device may degrade due to changing environmental conditions. Poor image quality can result in a reduced number of feature points, resulting in processing of inaccurate state information or in some scenarios, the inability to process any state information.

In some embodiments, poor image quality is caused by overexposure of the image. An image may be described as overexposed when it has a loss of highlight detail and/or when important parts of an image are "washed out." A processor may only be able to detect feature points from the portion of the overexposed image that was not washed out, leading to the identification of fewer feature points which may be difficult to distinguish from image noise.

In some embodiments, poor image quality occurs when the image depicts a scene with low or unobvious surface texture (e.g., a blank wall). Surface texture can be the nature of a surface as defined by lay, surface roughness, and waviness. An image with unobvious surface texture may have relatively low image contrast. An image of a surface with unobvious surface texture may result in fewer feature points that may be difficult to distinguish from image noise.

To mitigate this problem, a processor may determine state information using a plurality of image sequences taken by a plurality of imaging devices. If feature points are being extracted from many different fields of view, there may be a greater chance that at least one of the imaging devices produces a high quality image sequence suitable for determining the state information. However, using multiple sequences of image frames from multiple imaging devices in order to assess state information of the UAV can increase the use of computing resources and/or increase processing time. Accordingly, in some embodiments, only a subset of the multiple imaging devices is used to determine the state information. Various methods can be used to select which imaging device(s) to use. For example, the selection can be performed (e.g., with the aid of a processor) based on the quality of the image sequences produced by the imaging devices. The image quality can be determined based on the number of feature points present in the images of each image sequence, as previously described herein.

In some embodiments, the assessment of image quality for each image sequence is performed in parallel (e.g., simultaneously), such that the processing delay of the system is not necessarily increased even when processing images captured from multiple imaging devices. In some embodiments, the determination of state information from each image sequence is performed in serial (e.g., consecutively), such that the processing delay of the system can be increased if information from multiple imaging devices is processed to determine state information. Accordingly, it may be beneficial to select only a subset of the imaging devices to be used for determining state information while image sequences from all imaging devices are processed to determine image quality. In some embodiments, only one imaging device is selected. Alternatively, two, three, four, five, six, seven, eight, or more imaging devices can be selected.

The selection of the imaging devices for determining state information may be based on one or more criteria. The criteria can be predetermined criteria (e.g., preset prior to operation of the UAV by a user). Alternatively, the criteria can be determined during operation of the UAV, e.g., automatically or based on user input. Optionally, the criteria can be dynamic such that the criteria can be modified during operation of the UAV, e.g., in response to changing operational conditions. In some embodiments, the criteria may be related to the image quality or image saliency of the image sequence and/or individual images in the image sequence. The image quality or image saliency may be related to the feature point number of the image sequence, as previously described herein. In some embodiments, the "number of feature points" will be interchangeable with "image quality" for purposes of determining the criteria for the selection of imaging devices whose image sequence will be assessed to determine state information. For example, the criteria may be whether the overall image sequence or each image in the sequence has met a minimum threshold for image quality (e.g., has met a minimum feature point number). For example, the minimum feature point number used as an image quality threshold may be about 10, 20, 30, 40, 50, 60, 70, 80, 90, 100, 150, 200, 500 or more feature points. The criteria may be to select an imaging device that produces an image sequence with the highest average image quality (e.g., highest feature point number per image frame). The criteria may be to select an imaging device with a highest maximum image quality within the image sequence (e.g., highest maximum feature point number). The criteria may be to select an imaging device with the highest minimum image quality within the image sequence (e.g., the highest minimum feature point number). It is to be understood that the criteria can change according to the number of imaging devices that are to be selected. For example, if two image devices are to be selected, the criteria may be to select the two imaging devices with the first and second highest maximum image quality within the image sequence (e.g., first and second highest feature point numbers).

Referring again to FIG. 6, in some embodiments, one or more processors of the system 600 can assess the image quality of the captured image frames. For example, the processor 604 can be used to process the image sequences from each of the imaging devices 602 in order to assess the image quality of each image sequence. The processor 604 can process each image frame that is sent to it in order to determine an image quality. For example, in some embodiments, the processor 604 determines a plurality of feature points from each of the images in the image sequences, calculates a feature point number, and uses the feature point number to determine image quality. The feature point number for each sequence can be transmitted to the processor 606, which can use the feature point numbers as a basis for selecting the imaging device(s) for assessing state information. The image sequences obtained by selected imaging device(s) can then be processed by the processor 606 to generate state information.

Figure 7:
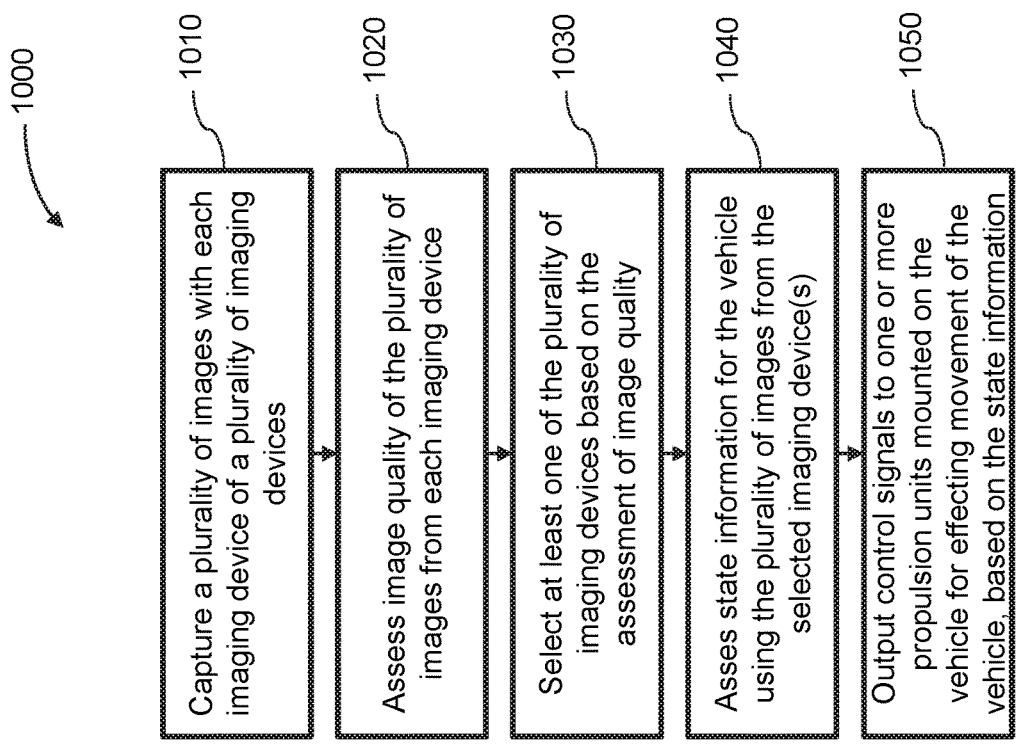
FIG. 7 illustrates a method for assessing state information and controlling a vehicle based on the processed information, in accordance with embodiments.

FIG. 7 illustrates a method 1000 for assessing state information and controlling a vehicle based on the processed information, in accordance with embodiments. The steps of the method 1000, as with all methods presented herein, can be performed using any embodiment of the systems and devices described herein. For example, the method 1000 can be performed by a navigation system carried by the UAV. In some embodiments, steps 1010 through 1050 of the method 1000 can be performed by one or more processors, at least some of which may be carried by the UAV. Furthermore, at least some of the steps may be performed automatically without requiring user input. Alternatively or in combination, at least some of the steps may involve user input. Some or all of the steps of the method 1000 can be repeated as desired. For example, the steps 1010 through 1050 may be repeated at a desired rate. The rate may be less than or equal to about once every 0.005 seconds, 0.01 seconds, 0.02 seconds, 0.05 seconds, 0.1 seconds, 0.2 seconds, 0.5 seconds, 1 second, 2 seconds, 5 seconds, 10 seconds, 20 seconds, 50 seconds, 100 seconds, 200 seconds, 500 seconds, 1000 seconds, or 3600 seconds. In some embodiments, the rate may be about once every 0.02 seconds to about once every 0.1 seconds.

In step 1010, a plurality of sequence of images can be captured by the plurality of imaging devices over a time interval. The time interval may be less than or equal to about 0.005 seconds, 0.01 seconds, 0.02 seconds, 0.05 seconds, 0.1 seconds, 0.2 seconds, 0.5 seconds, 1 second, 2 seconds, 5 seconds, 10 seconds, 20 seconds, 50 seconds, 100 seconds, 200 seconds, 500 seconds, 1000 seconds, or 3600 seconds. In some embodiments, the time interval may be within a range from about 0.02 seconds to about 0.1 seconds. In some embodiments, the time interval may be within a range from about 0.005 seconds to about 10 seconds. An image sequence captured during the time interval can be comprised of about 1 image, 2 images, 5 images, 10 images, 20 images, 50 images, 100 images, 200 images, 500 images, or 1000 images. Optionally, the imaging devices may be arranged on the UAV such that each of the plurality of images is captured from a different field of view, as previously discussed herein.

In step 1020, the image quality of the plurality of images from each imaging device can be assessed with the aid of a processor. The image quality can be related to the feature point number, as previously described herein. The determination of image quality can be processed in parallel (e.g., all image sequences simultaneously). Thus the processing delay of the system may not be necessarily increased even if images captured from multiple imaging devices are processed for image quality.

In step 1030, at least one of the image sequences taken by the plurality of imaging devices can be selected based on the assessment of image quality of step 1020. The selection of the imaging devices may be based on one or more criteria. The criteria may be related to the image quality or image saliency of the image sequences, as previously described herein. For example, the criteria may be whether the overall image sequence or each image in the sequence met a minimum threshold for image quality. The criteria may be to select an imaging device that had an image sequence with the highest average image quality. The criteria may be to select an imaging device with a highest maximum image quality within the image sequence. The criteria may be to select an imaging device with the highest minimum image quality within the image sequence. It is to be understood that the criteria may change according to the number of imaging devices that are to be selected. For example, if selecting two image devices, the criteria may be to select the two imaging devices with the first and second highest maximum image quality within the image sequence. In some embodiments, the "number of feature points" will be interchangeable with "image quality" for purposes of determining the criteria for the selection of imaging devices whose image sequence will be assessed to determine state information.

In step 1040, the state information for the UAV can be assessed with the aid of the processor, using the plurality of images from the imaging device(s) selected in step 1030. An assessment or determination of state information from the processor can be performed in serial (e.g., one image sequence at a time, consecutively). Thus the processing delay of the system can be increased if information from multiple imaging devices is processed. By having a criterion for selecting an image sequence from only a subset of the imaging devices to be processed in determining state information, processing time and computing resources can be saved. In some embodiments, while image quality is assessed for all images taken by the plurality of imaging devices as it is processed in parallel, the state information is assessed using data from only a subset of the imaging devices because it is serially processed. Moreover, the determination of state information can be more computationally intensive than image quality determination which can be a low level image processing operation that is computationally inexpensive. Thus, FIG. 7 can illustrate a method of determining state information that is computationally and temporally efficient.

In step 1050, the state information can optionally be used as a basis for outputting signals to cause the UAV to navigate within the environment. The signal can include control signals for the propulsion system (e.g., rotors) of the UAV for effecting movement of the vehicle. The signal can be generated based on user commands that are input into a remote terminal or other user device and subsequently transmitted to the UAV. Alternatively, the signal can be autonomously generated by the UAV (e.g., an automated onboard controller). In some instances, the signal can be generated semi-autonomously with contributions from user input as well as being automated. In some embodiments, the state information is used as input for a flight control algorithm that produces the control signals.

Figure 8:
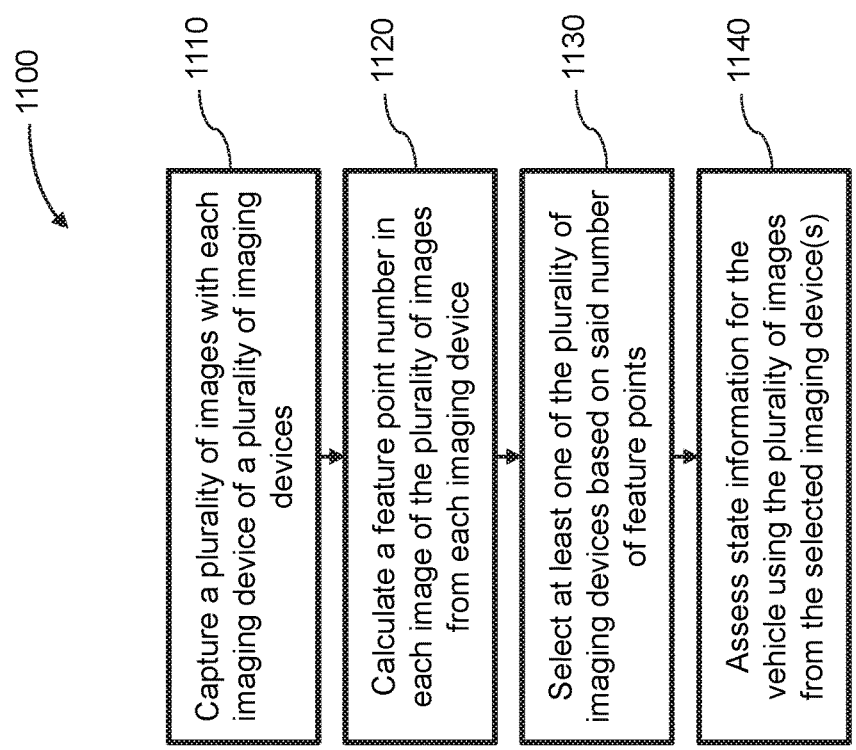
FIG. 8 illustrates a method for assessing state information based on calculating a feature point number, in accordance with embodiments.

FIG. 8 illustrates a method 1100 for assessing state information based on calculating a feature point number, in accordance with embodiments. The method 1100 can be understood as a specialized version of the method 1000 in which the image quality of the plurality of images taken by each imaging device is assessed by calculating a feature point number in each image of the images.

The steps 1110 through 1150 of the method 1100 can be performed by one or more processors, at least some of which may be carried by the UAV. In some embodiments, the method 1100 is performed by a navigation system of the UAV. Furthermore, at least some of the steps may be performed automatically without requiring user input. Alternatively or in combination, at least some of the steps may involve user input. Some or all of the steps of the method 1100 can be repeated as desired. For example, the steps 1110 through 1150 may be repeated at a desired rate. The rate may be less than or equal to about once every 0.005 seconds, 0.01 seconds, 0.02 seconds, 0.05 seconds. 0.1 seconds, 0.2 seconds, 0.5 seconds, 1 second, 2 seconds, 5 seconds, 10 seconds, 20 seconds, 50 seconds, 100 seconds, 200 seconds, 500 seconds, 1000 seconds, or 3600 seconds. In some embodiments, the rate may be about once every 0.02 seconds to about once every 0.1 seconds.

In step 1110, a plurality of sequence of images can be captured by each imaging device of the plurality of imaging devices over a time interval. The time interval may be less than or equal to about 0.005 seconds, 0.01 seconds, 0.02 seconds, 0.05 seconds, 0.1 seconds, 0.2 seconds, 0.5 seconds, 1 second, 2 seconds, 5 seconds, 10 seconds, 20 seconds, 50 seconds, 100 seconds, 200 seconds, 500 seconds, 1000 seconds, or 3600 seconds. In some embodiments, the time interval may be within a range from about 0.02 seconds to about 0.1 seconds. In some embodiments, the time interval may be within a range from about 0.005 seconds to about 10 seconds. An image sequence captured during the time interval can be comprised of about 1 image, 2 images, 5 images, 10 images, 20 images, 50 images, 100 images, 200 images, 500 images, or 1000 images. The imaging devices may be arranged on the UAV such that each of the plurality of images is captured from a different field of view, as previously discussed herein.

In step 1120, a feature point number is calculated in each image of the plurality of images from each imaging device, e.g., with the aid of a processor. In some embodiments, the feature point number may be assessed by calculating a feature point number in each image, using a feature detection algorithm such as FAST. The calculation of the feature point number can be processed in parallel. Thus the processing delay of the system may not be necessarily increased even if images captured from multiple imaging devices are processed for a feature point number.

In step 1130, at least one of the plurality of imaging devices can be selected based on the assessment of step 1120. The selection of the imaging devices may be based on one or more criteria. The criteria may be related to the feature point number of the image sequences. For example, the criteria may be whether the overall image sequence or each image in the sequence met a minimum threshold for a feature point number. The criteria may be to select an imaging device that had an image sequence with the highest average feature point number. The criteria may be to select an imaging device with a highest maximum feature point number within the image sequence. The criteria may be to select an imaging device with the highest minimum feature point number within the image sequence. It is to be understood that the criteria may change according to the number of imaging devices that are to be selected. For example, if selecting two image devices, the criteria may be to select the two imaging devices with the first and second highest maximum feature point number within the image sequence.

In step 1140, the state information for the UAV can be assessed with the aid of the processor, using the plurality of images selected in step 1130. An determination of state information from the processor can be performed in serial. Thus the processing delay of the system can be increased if information from multiple imaging devices is processed. By having a criterion for selecting a subset of the images to be processed in determining state information, processing time and computing resources can be saved.

Optionally, the state information can be used as a basis for outputting signals to cause the UAV to navigate within the environment. The signal can include control signals for the propulsion system (e.g., rotors) of the UAV for effecting movement of the vehicle. The signal can be generated based on user commands that are input into a remote terminal or other user device and subsequently transmitted to the UAV. Alternatively, the signal can be autonomously generated by the UAV (e.g., an automated onboard controller implementing suitable flight control algorithms). In some instances, the signal can be generated semi-autonomously with contributions from user input as well as being automated.

In some embodiments, one or more imaging devices are designated as the "default" imaging devices to be used for assessing state information. Such imaging devices may be referred to herein as "primary imaging devices." Imaging devices that are not selected by default may be referred to herein as "secondary imaging devices." A primary or default imaging device can be an imaging device whose image sequence is always used in order to determine image quality and whose image sequence is used to assess state information of the UAV if the image quality is deemed satisfactory. A secondary or non-default imaging device can be an imaging device whose image sequence is assessed for image quality only if the image quality of the image sequence taken by the primary imaging device is deemed unsatisfactory. An image sequence taken by a secondary imaging device may be used to assess state information of the UAV only if an image sequence taken by the primary imaging device is of unsatisfactory image quality. A UAV can have any suitable number of primary and secondary imaging devices. For example, a UAV may have one, two, three, four, five, six, seven, eight, or more primary imaging devices. A UAV may have one, two, three, four, five, six, seven, eight, or more secondary imaging devices. The UAV may have more primary imaging devices than secondary imaging devices, or vice-versa. Optionally, the number of primary imaging devices may be equal to the number of secondary imaging devices.

In some embodiments, a primary imaging device may be the imaging device oriented substantially along the direction of motion of the UAV. The primary imaging device can be considered to be oriented substantially along the direction of motion when the field of view of the primary imaging device overlaps with the direction of motion. In some embodiments, a primary imaging device may be considered to be oriented substantially along the direction of motion of the UAV when the field of view or optical axis is aligned with the direction of motion. In some embodiments, a primary imaging device may be considered to be oriented substantially along the direction of motion of the UAV when the field of view or optical axis of the imaging device is within or about 10°, 20°, 30°, 40°, 50°, 60°, 70°, 80°, 90°, 100°, 110°, 120°, 130°, 140°, 150°, 160°, 170°, or 180° of the direction of motion. The primary imaging device may change as the direction of motion of the UAV changes. A primary imaging device may no longer be oriented in the direction of motion of the UAV after the direction of motion of the UAV changes.

Figure 9:
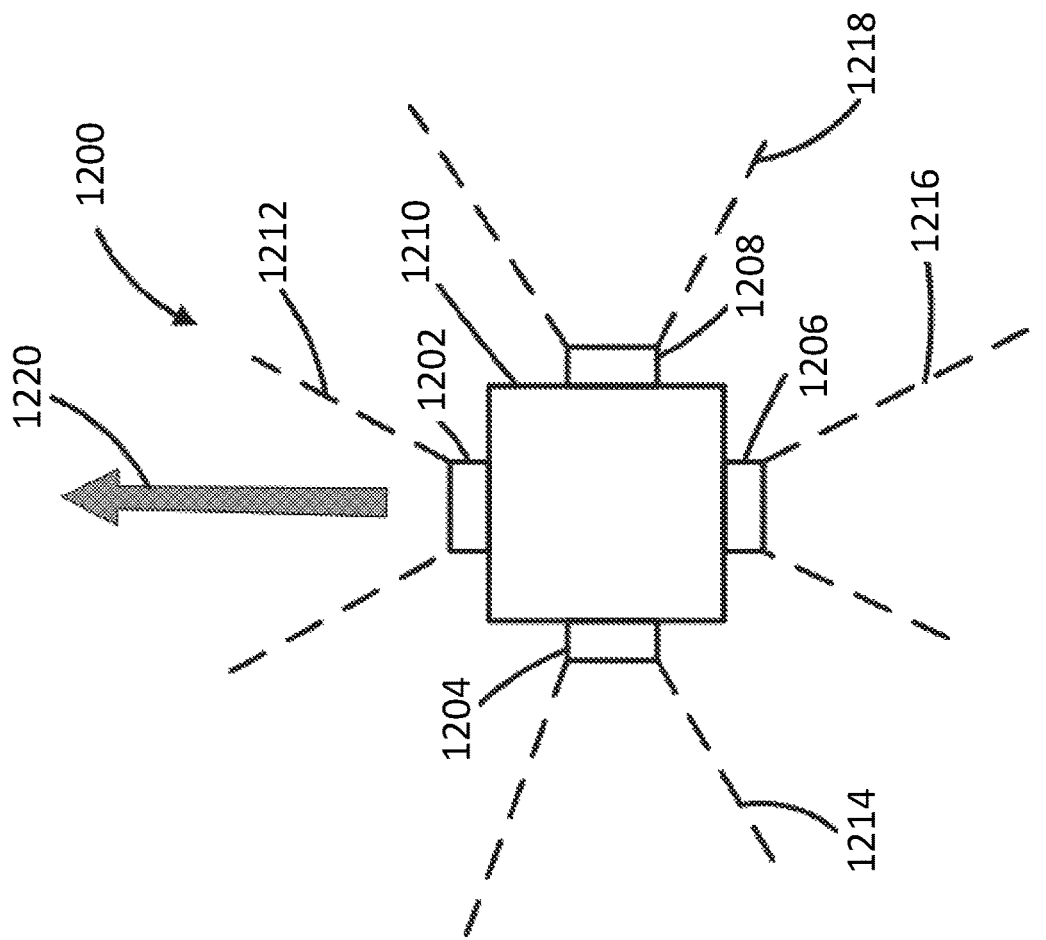
FIG. 9 illustrates a top view of a UAV in motion with a primary imaging device and secondary imaging devices, in accordance with embodiments.

FIG. 9 illustrates a top view of a UAV 1200 in motion with a primary imaging device 1202 and secondary imaging devices 1204, 1206, 1208, in accordance with embodiments. The UAV 1200 includes a vehicle body 1210 carrying the imaging devices 1202, 1204, 1206, 1208. Each of the imaging devices 1202, 1204, 1206, 1208 is coupled to a different side of the UAV 1200, and has a corresponding field of view 1212, 1214, 1216, 1218. The UAV 1200 can be propelled by one or more propulsion units (not shown) to move along a movement direction (indicated by the arrow 1220). The movement direction of the UAV may be in any direction. The UAV may move horizontally (e.g., forward, backward, left, right), vertically (e.g., up, down) or in any combination. In the embodiment of FIG. 9, the imaging device 1202 is designated as the primary imaging device because the field of view 1212 is oriented along the movement direction, while the fields of view 1214, 1216, 1218 of the secondary imaging devices 1204, 1206, 1208 are not oriented along the movement direction. In some embodiments, if the movement direction subsequently changes, the designations of the primary and secondary imaging devices may change, such that the imaging device oriented along the new movement direction is designated to be the new primary imaging device.

In alternative embodiments, the selection of the primary imaging device is performed independently of the direction of motion of the UAV. For example, primary and secondary imaging devices may be selected based on other criteria (e.g., user preference, feature point number, image quality, power consumption, etc.). Accordingly, the primary imaging device may not be oriented substantially along the movement direction of the UAV.

An image sequence taken by a primary imaging device may be processed to assess the state information of the UAV, if the image quality of the primary imaging device satisfies a certain criteria or passes a certain threshold. The criteria may be whether the overall image sequence met a minimum threshold for image quality, whether each image in the sequence met a minimum threshold for image quality, or whether a subset of the images in the image sequence met a minimum threshold for image quality. In some embodiments, the "number of feature points" will be interchangeable with "image quality" for purposes of determining the criteria whether images taken by the primary imaging device will be used for processing of UAV state information. For example, the minimum threshold for image quality may be a feature point number, such as no less than about 10, 20, 30, 40, 50, 60, 70, 80, 90, 100, 150, 200, 500 or more feature points. If the image quality of the primary imaging device does not satisfy a certain criteria and/or pass a certain threshold, the image quality of the secondary imaging devices may be determined. At least one of the secondary imaging devices can be selected for processing of state information based on one or more criteria.

The selection of the imaging devices for processing of state information when the primary imaging device did not take an image sequence of satisfactory quality may be based on one or more criteria. The criteria may be whether the overall image sequence or each image in the image sequence met a minimum threshold for image quality. The criteria may be an imaging device that had an image sequence with the highest average image quality. The criteria may be an imaging device with a highest maximum image quality within the image sequence. The criteria may be an imaging device with the highest minimum image quality within the image sequence. It is to be understood that the criteria will change according to the number of imaging devices that are to be selected. For example, if selecting two image devices, the criteria may be two imaging devices with the first and second highest maximum image quality within the image sequence. In some embodiments, the "number of feature points" will be interchangeable with "image quality" for purposes of determining the criteria for the selection of imaging devices whose image sequence will be assessed to determine state information. In some embodiments, secondary imaging devices whose image sequence was used in the processing of state information can be designated as a new primary imaging device. The previous primary imaging device that did not have a satisfactory image quality may become a secondary imaging device. In some embodiments, the direction of motion of the UAV may not be associated with the primary and secondary imaging devices.

Figure 10:
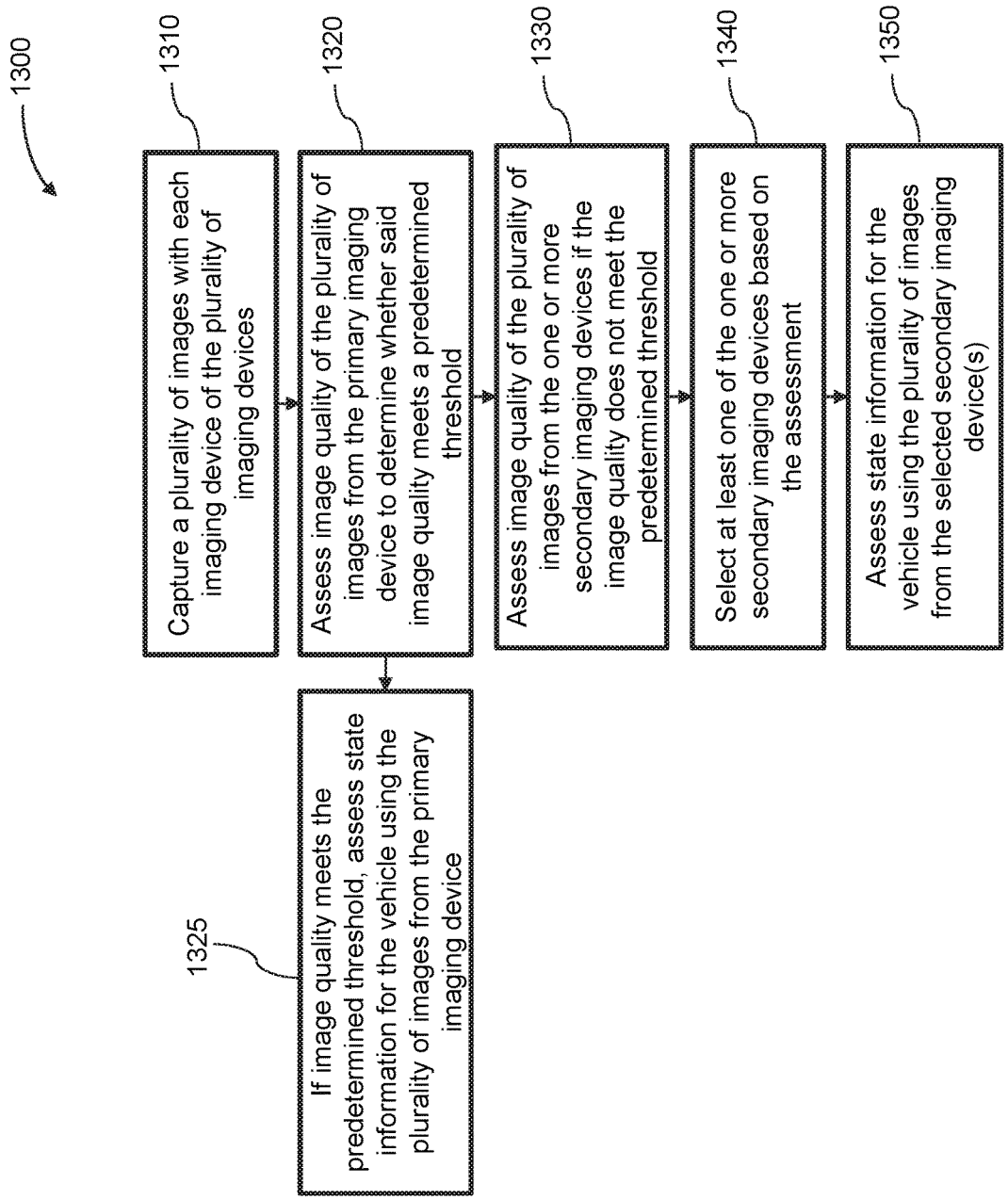
FIG. 10 illustrates a method for assessing state information based on primary and secondary imaging devices, in accordance with embodiments.

FIG. 10 illustrates a method 1300 for assessing state information based on primary and secondary imaging devices, in accordance with embodiments. The steps 1310-1350 in FIG. 10 can be performed by one or more processors, some of which may be carried by the UAV. In some embodiments, the method 1300 is performed by a navigation system for the UAV. Furthermore, the steps may be performed automatically without requiring user input. The steps 1310-1350 in FIG. 10 may be repeated at a desired rate. The rate may be less than or equal to about every 0.005 seconds, 0.01 seconds, 0.02 seconds, 0.05 seconds. 0.1 seconds, 0.2 seconds, 0.5 seconds, 1 second, 2 seconds, 5 seconds, 10 seconds, 20 seconds, 50 seconds, 100 seconds, 200 seconds, 500 seconds, 1000 seconds, or 3600 seconds. In some embodiments, the rate may be about once every 0.02 seconds to about once every 0.1 seconds.

In step 1310, a plurality of images can be captured by each imaging device of the plurality of imaging devices over a time interval. The time interval may be less than or equal to about 0.005 seconds, 0.01 seconds, 0.02 seconds, 0.05 seconds, 0.1 seconds, 0.2 seconds, 0.5 seconds, 1 second, 2 seconds, 5 seconds, 10 seconds, 20 seconds, 50 seconds, 100 seconds, 200 seconds, 500 seconds, 1000 seconds, or 3600 seconds. In some embodiments, the time interval may be within a range from about 0.02 seconds to about 0.1 seconds. An image sequence captured during the time interval can be comprised of about 1 image, 2 images, 5 images, 10 images, 20 images, 50 images, 100 images, 200 images, 500 images, or 1000 images. The imaging devices may be arranged on the UAV such that each of the plurality of images is captured from a different field of view, as previously discussed herein. Optionally, the imaging devices may be arranged on the UAV such that each of the plurality of images is captured with a different field of view. The plurality of imaging devices may include one or more primary imaging devices (e.g., a single primary imaging device) and one or more secondary imaging devices.

In step 1320, the image quality of the plurality of images from the primary imaging device can be assessed (e.g., with the aid of a processor) to determine whether the image quality meets a predetermined threshold, as previously described. In some embodiments, the image quality may be determined based on the total number of feature points in an image. If said image quality in the sequence of images meets a predetermined threshold, the images captured by the primary imaging devices may be used to assess or determine the state information. Alternatively, other types of criteria can be used to assess the image quality of the images from the primary imaging device. The criteria may be whether the overall image sequence or each image in the sequence met a minimum threshold for image quality. In some embodiments, the "number of feature points" will be interchangeable with "image quality" for purposes of determining the criteria of whether images taken by the primary imaging device will be used for processing of UAV state information.

In step 1325, if the image quality meets the predetermined threshold (or satisfies the criteria) as assessed in step 1320, the state information of the UAV can be assessed with the aid of the processor using the plurality of images taken by the primary imaging device.

In step 1330, if the image quality in step 1320 did not meet the predetermined threshold (or satisfy the criteria), the image quality of the plurality of images from the one or more secondary imaging devices can be assessed with the aid of a processor. In some embodiments, the image quality may be assessed or determined by the total number of feature points in an image, as previously described herein.

In step 1340, at least one of the one or more secondary imaging devices can be selected based on the assessment of step 1330. The selection of the imaging devices may be based on one or more criteria. The criteria may be whether the overall image sequence or each image in the sequence met a minimum threshold for image quality. The criteria may be an imaging device that had an image sequence with the highest average image quality. The criteria may be an imaging device with a highest maximum image quality within the image sequence. The criteria may be an imaging device with the highest minimum image quality within the image sequence. It is to be understood that the criteria will change according to the number of imaging devices that are to be selected. For example, if selecting two image devices, the criteria may be two imaging devices with the first and second highest maximum image quality within the image sequence. In some embodiments, the "number of feature points" will be interchangeable with "image quality" for purposes of determining the criteria for the selection of imaging devices whose image sequence will be assessed to determine state information.

In some embodiments, if the image sequences taken by the secondary imaging device(s) are of lower image quality than the primary imaging device(s) (e.g., none of the imaging devices captured an image sequence that passed the predetermined threshold), the primary imaging device can be selected for the purpose of assessing state information of the UAV despite not having passed the predetermined criteria or threshold.

In step 1350, the state information of the UAV can be assessed with the aid of the processor, using the plurality of images from the secondary imaging device(s) selected in step 1340. The state information can be determined, e.g., based on the image sequences captured by the selected imaging devices as previously described herein. In some embodiments, state information of the UAV can be assessed with the aid of the processor using the plurality of images taken by the primary imaging device if the secondary imaging devices took an image sequence of lower quality than the primary imaging device. In some embodiments, the results of the state information assessment can vary based on the field of view of the imaging sequence used. Accordingly, the assessment of the state information (which can be used for navigation) can take into account any changes in the field of view of the selected imaging device(s).

In some embodiments, the imaging device(s) whose image sequence(s) were used to assess the state information of the UAV can become or remain "primary imaging device(s)." A primary imaging device is an imaging device whose image sequence is always assessed to determine image quality and whose image sequence is used to assess state information of the UAV if the image quality is deemed satisfactory. Imaging device(s) whose image sequence(s) were not used to assess the state information of the UAV may become or remain "secondary imaging device(s)." A secondary imaging device is an imaging device whose image sequence is assessed for image quality only if the image quality of the image sequence taken by the primary imaging device is deemed unsatisfactory.

Optionally, the state information assessed in step 1350 can be used as a basis for outputting signals to cause the UAV to navigate within the environment. The signal can include control signals for the propulsion system (e.g., rotors) of the UAV for effecting movement of the vehicle. The signal can be generated based on user commands that are input into a remote terminal or other user device and subsequently transmitted to the UAV. Alternatively, the signal can be autonomously generated by the UAV (e.g., an automated onboard controller). In some instances, the signal can be generated semi-autonomously with contributions from user input as well as automated.

FIG. 11 illustrates exemplary feature point numbers for three image sequences obtained by three secondary imaging devices, in accordance with embodiments. Image sequence 1405 shows feature point numbers for ten image frames taken by the secondary imaging device #1. Image sequence 1410 shows feature point numbers for ten image frames taken by the secondary imaging device #2. Image sequence 1415 shows feature point numbers for ten image frames taken by the secondary imaging device #3. The imaging devices #1, #2, and #3 can be capturing images with different fields of view and/or with different optical axes, as previously described herein. In the embodiment of FIG. 11 the number of feature points in each image frame taken by a "primary imaging device" is less than a threshold T1 during a time interval t (not shown). The threshold T1 may be about 100 feature points. Therefore, the images taken by the primary imaging device may not necessarily be used to assess state information of the UAV and image quality of the images taken by the secondary imaging devices which have different fields of views with respect to each other and with respect to the primary imaging device can be assessed.

The number of feature points extracted from each one of the 10 image frames taken by each secondary imaging device during time t (e.g., 2 seconds) can be counted in order to determine if there is an image sequence that is better suited for assessing state information. In FIG. 11, the minimum number of feature points in 10 frames taken by secondary imaging device #1 is 51 (shown in Frame 2), the minimum number of feature points in 10 frames taken by secondary imaging device #2 is 62 (shown in Frame 6), and the minimum number of feature points in 10 frames taken by secondary imaging device #3 is 49 (shown in Frame 1). The secondary imaging device that had taken an image frame with the maximum value among these minimum numbers can be selected (e.g., secondary imaging device #2). The selected secondary imaging device can become a primary imaging device and/or be selected to be used for determining state information. In some embodiments, if the minimum number of feature points in the 10 frames taken by the selected secondary imaging device is larger than a second threshold T2, then a secondary imaging device that had been selected can become a primary imaging device and/or be selected to be used for determining state information. The threshold T2 may be about 120 feature points. In some embodiments, the state information of the UAV can be processed using an image sequence taken by the new primary imaging device.

Alternatively, the maximum value among the number of feature points in 10 image frames taken by the secondary imaging devices can be compared to select an imaging device. In FIG. 11, this is 72 for secondary imaging device #1 (shown in Frame 4), 82 for secondary imaging device #2 (shown in Frame 4) and 77 for secondary imaging device #3 (shown in Frame 10). The secondary imaging device that had taken an image frame with the maximum value among these maximum numbers can be selected (e.g. secondary imaging device #2). The selected secondary imaging device can become a primary imaging device and/or be selected to be used for assessing state information. In some embodiments, if the maximum number of feature points in the 10 frames taken by the selected secondary imaging device is larger than a second threshold T2, then a secondary imaging device that had been selected can become a primary imaging device and/or be selected to be used for determining state information. In some embodiments, the state information of the UAV can be processed using an image sequence taken by the new primary imaging device.

Alternatively, the average or total value of the feature points in 10 image frames taken by the secondary imaging devices can be compared to select an imaging device. In FIG. 11, this is 61.1 (611 total) for secondary imaging device #1, 71.3 (713 total) for secondary imaging device #2, and 64.1 (641 total) for secondary imaging device #3. The secondary imaging device with the highest average or total value of feature points can be selected (e.g. secondary imaging device #2). The selected secondary imaging device can become a primary imaging device and/or be selected to be used for determining state information. In some embodiments, if the average or total number of feature points in the 10 frames taken by the selected secondary imaging device is larger than a second threshold T2, then a secondary imaging device that had been selected can become a primary imaging device and/or be selected to be used for assessing state information. In some embodiments, the state information of the UAV can be processed using an image sequence taken by the new primary imaging device.

A secondary imaging device that has captured an image sequence that has the high image quality value can be chosen to assess the state information of the UAV when the primary imaging device does not capture an image sequence suitable to be used in determining state information. In some embodiments, other criteria described previously may be chosen as a basis for selecting an imaging device best suited for assessing state information of the UAV. The approach described herein and shown in FIG. 11 can be used in combination with other methods (e.g., performed as part of step 1030-1050 of method 1000). For example, the state information may be assessed and be used as a basis to output control signals to one or more propulsion units mounted on the vehicle for effecting movement of the vehicle.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avians, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 12:
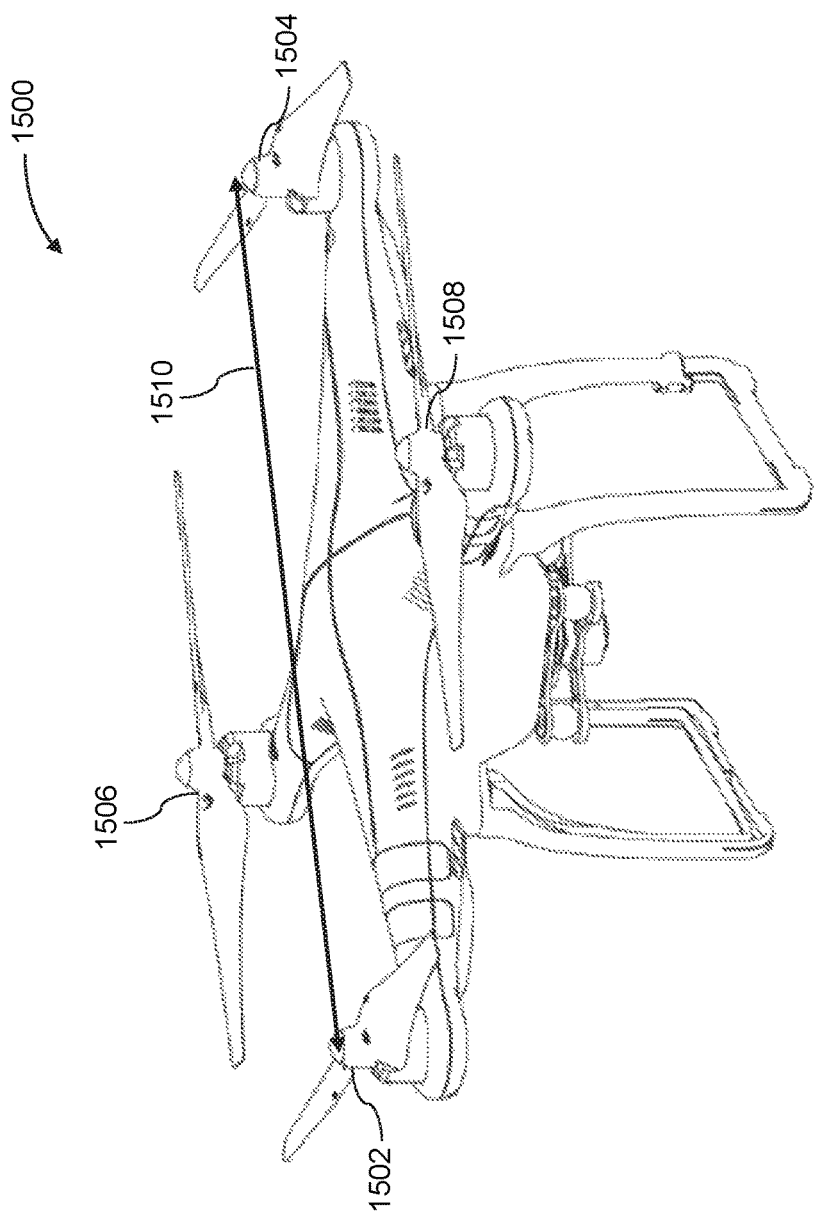
FIG. 12 illustrates a UAV, in accordance with embodiments.

FIG. 12 illustrates an unmanned aerial vehicle (UAV) 1500, in accordance with embodiments of the present invention. The UAV may be an example of a movable object as described herein. The UAV 1500 can include a propulsion system having four rotors 1502, 1504, 1506, and 1508. Any number of rotors may be provided (e.g., one, two, three, four, five, six, seven, eight, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1510. For example, the length 1510 can be less than or equal to 2 m, or less than equal to 5 m. In some embodiments, the length 1510 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 13:
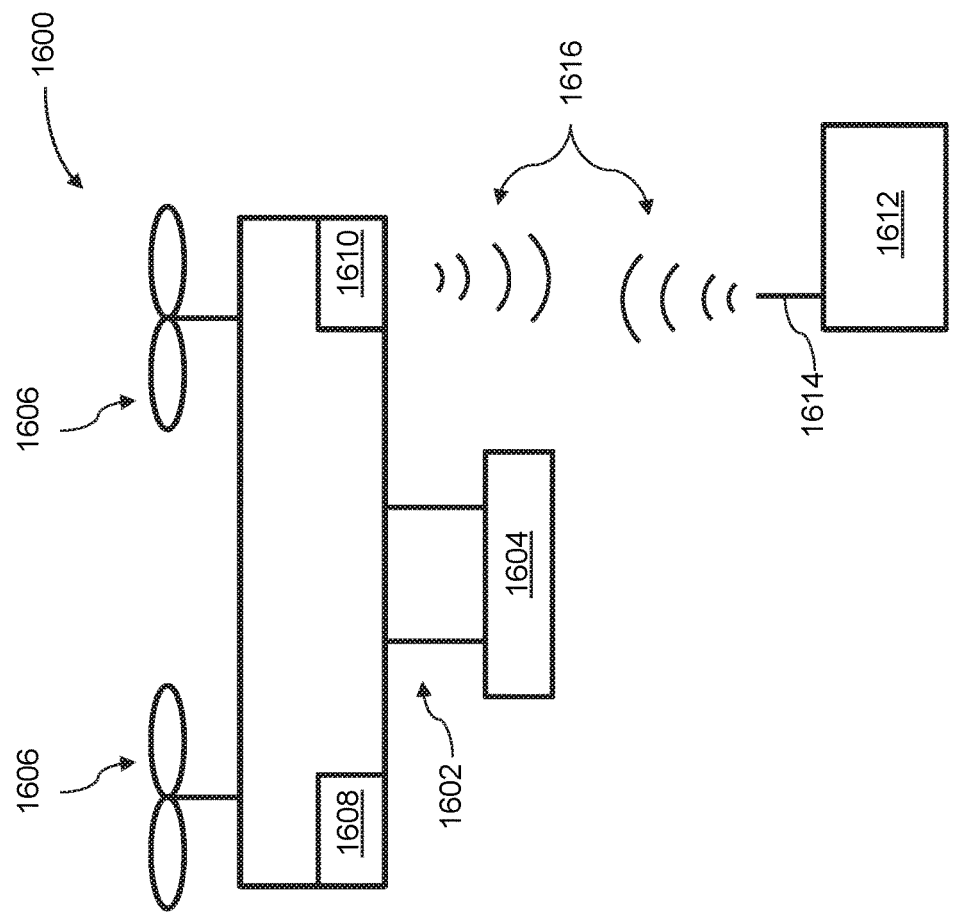
FIG. 13 illustrates a movable object including a carrier and a payload, in accordance with embodiments.

FIG. 13 illustrates a movable object 1600 including a carrier 1602 and a payload 1604, in accordance with embodiments. Although the movable object 1600 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1604 may be provided on the movable object 1600 without requiring the carrier 1602. The movable object 1600 may include propulsion mechanisms 1606, a sensing system 1608, and a communication system 1610.

The propulsion mechanisms 1606 can include one or more of rotors, propellers, blades, engines, motors, wheels, axles, magnets, or nozzles, as previously described. For example, the propulsion mechanisms 1606 may be rotor assemblies or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1606 can be mounted on the movable object 1600 using any suitable means, such as a support element (e.g., a drive shaft) as described elsewhere herein. The propulsion mechanisms 1606 can be mounted on any suitable portion of the movable object 1600, such on the top, bottom, front, back, sides, or suitable combinations thereof.

In some embodiments, the propulsion mechanisms 1606 can enable the movable object 1600 to take off vertically from a surface or land vertically on a surface without requiring any horizontal movement of the movable object 1600 (e.g., without traveling down a runway). Optionally, the propulsion mechanisms 1606 can be operable to permit the movable object 1600 to hover in the air at a specified position and/or orientation. One or more of the propulsion mechanisms 1600 may be controlled independently of the other propulsion mechanisms. Alternatively, the propulsion mechanisms 1600 can be configured to be controlled simultaneously. For example, the movable object 1600 can have multiple horizontally oriented rotors that can provide lift and/or thrust to the movable object. The multiple horizontally oriented rotors can be actuated to provide vertical takeoff, vertical landing, and hovering capabilities to the movable object 1600. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1600 (e.g., with respect to up to three degrees of translation and up to three degrees of rotation).

The sensing system 1608 can include one or more sensors that may sense the spatial disposition, velocity, and/or acceleration of the movable object 1600 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1608 can be used to control the spatial disposition, velocity, and/or orientation of the movable object 1600 (e.g., using a suitable processing unit and/or control module, as described below). Alternatively, the sensing system 1608 can be used to provide data regarding the environment surrounding the movable object, such as weather conditions, proximity to potential obstacles, location of geographical features, location of manmade structures, and the like.

The communication system 1610 enables communication with terminal 1612 having a communication system 1614 via wireless signals 1616. The communication systems 1610, 1614 may include any number of transmitters, receivers, and/or transceivers suitable for wireless communication. The communication may be one-way communication, such that data can be transmitted in only one direction. For example, one-way communication may involve only the movable object 1600 transmitting data to the terminal 1612, or vice-versa. The data may be transmitted from one or more transmitters of the communication system 1610 to one or more receivers of the communication system 1612, or vice-versa. Alternatively, the communication may be two-way communication, such that data can be transmitted in both directions between the movable object 1600 and the terminal 1612. The two-way communication can involve transmitting data from one or more transmitters of the communication system 1610 to one or more receivers of the communication system 1614, and vice-versa.

In some embodiments, the terminal 1612 can provide control data to one or more of the movable object 1600, carrier 1602, and payload 1604 and receive information from one or more of the movable object 1600, carrier 1602, and payload 1604 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1606), or a movement of the payload with respect to the movable object (e.g., via control of the carrier 1602). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1608 or of the payload 1604). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1612 can be configured to control a state of one or more of the movable object 1600, carrier 1602, or payload 1604. Alternatively or in combination, the carrier 1602 and payload 1604 can also each include a communication module configured to communicate with terminal 1612, such that the terminal can communicate with and control each of the movable object 1600, carrier 1602, and payload 1604 independently.

In some embodiments, the movable object 1600 can be configured to communicate with another remote device in addition to the terminal 1612, or instead of the terminal 1612. The terminal 1612 may also be configured to communicate with another remote device as well as the movable object 1600. For example, the movable object 1600 and/or terminal 1612 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1600, receive data from the movable object 1600, transmit data to the terminal 1612, and/or receive data from the terminal 1612. Optionally, the remote device can be connected to the Internet or other telecommunications network, such that data received from the movable object 1600 and/or terminal 1612 can be uploaded to a website or server.

Figure 14:
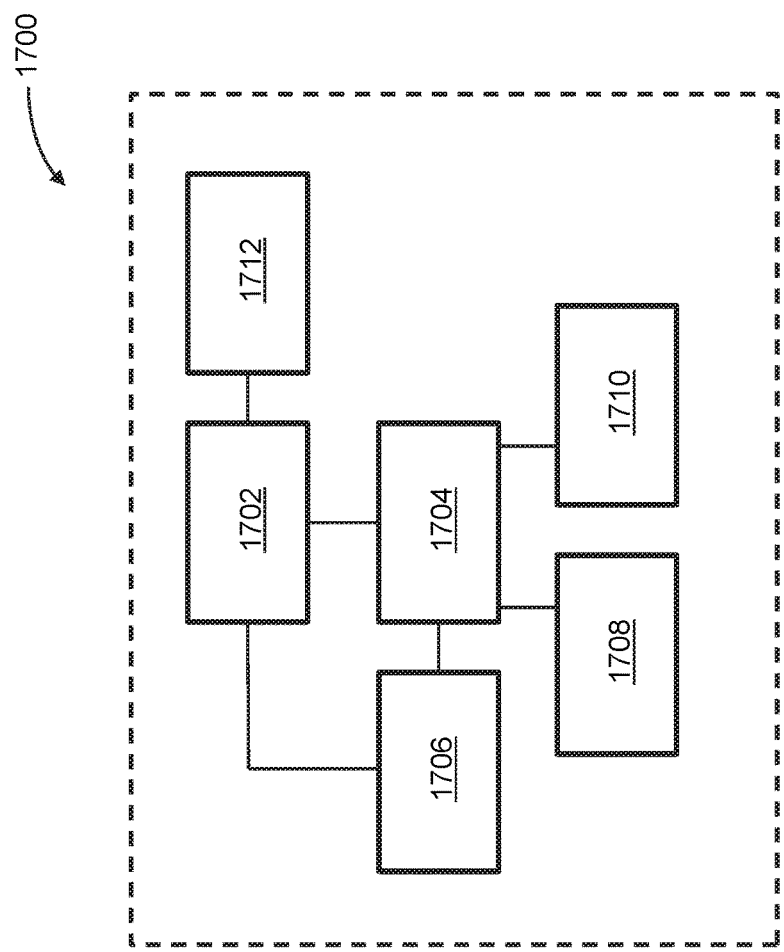
FIG. 14 illustrates a system for controlling a movable object, in accordance with embodiments.

FIG. 14 is a schematic illustration by way of block diagram of a system 1700 for controlling a movable object, in accordance with embodiments. The system 1700 can be used in combination with any suitable embodiment of the systems, devices, and methods disclosed herein. The system 1700 can include a sensing module 1702, processing unit 1704, non-transitory computer readable medium 1706, control module 1708, and communication module 1710.

The sensing module 1702 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1702 can be operatively coupled to a processing unit 1704 having a plurality of processors. In some embodiments, the sensing module can be operatively coupled to a transmission module 1712 (e.g., a Wi-Fi image transmission module) configured to directly transmit sensing data to a suitable external device or system. For example, the transmission module 1712 can be used to transmit images captured by a camera of the sensing module 1702 to a remote terminal.

The processing unit 1704 can have one or more processors, such as a programmable processor (e.g., a central processing unit (CPU)). The processing unit 1704 can be operatively coupled to a non-transitory computer readable medium 1706. The non-transitory computer readable medium 1706 can store logic, code, and/or program instructions executable by the processing unit 1704 for performing one or more steps. The non-transitory computer readable medium can include one or more memory units (e.g., removable media or external storage such as an SD card or random access memory (RAM)). In some embodiments, data from the sensing module 1702 can be directly conveyed to and stored within the memory units of the non-transitory computer readable medium 1706. The memory units of the non-transitory computer readable medium 1706 can store logic, code and/or program instructions executable by the processing unit 1704 to perform any suitable embodiment of the methods described herein. For example, the processing unit 1704 can be configured to execute instructions causing one or more processors of the processing unit 1704 to analyze sensing data produced by the sensing module. The memory units can store sensing data from the sensing module to be processed by the processing unit 1704. In some embodiments, the memory units of the non-transitory computer readable medium 1706 can be used to store the processing results produced by the processing unit 1704.

In some embodiments, the processing unit 1704 can be operatively coupled to a control module 1708 configured to control a state of the movable object. For example, the control module 1708 can be configured to control the propulsion mechanisms of the movable object to adjust the spatial disposition, velocity, and/or acceleration of the movable object with respect to six degrees of freedom. Alternatively or in combination, the control module 1708 can control one or more of a state of a carrier, payload, or sensing module.

The processing unit 1704 can be operatively coupled to a communication module 1710 configured to transmit and/or receive data from one or more external devices (e.g., a terminal, display device, or other remote controller). Any suitable means of communication can be used, such as wired communication or wireless communication. For example, the communication module 1710 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1710 can transmit and/or receive one or more of sensing data from the sensing module 1702, processing results produced by the processing unit 1704, predetermined control data, user commands from a terminal or remote controller, and the like.

The components of the system 1700 can be arranged in any suitable configuration. For example, one or more of the components of the system 1700 can be located on the movable object, carrier, payload, terminal, sensing system, or an additional external device in communication with one or more of the above. Additionally, although FIG. 14 depicts a single processing unit 1704 and a single non-transitory computer readable medium 1706, one of skill in the art would appreciate that this is not intended to be limiting, and that the system 1700 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1700 can occur at one or more of the aforementioned locations.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A system for navigating a vehicle within an environment, comprising:
   a plurality of sensors arranged on the vehicle such that each sensor of said plurality of sensors is configured to obtain sensor data from a different field of view; and
   one or more processors operably coupled to the plurality of sensors and individually or collectively configured to:
   select a subset of sensors from said plurality of sensors to be used for navigating the vehicle within the environment based on one or more predetermined criteria;
   process the sensor data from the selected subset of sensors without processing the sensor data from unselected sensors of the plurality of sensors so as to generate navigation information for navigating the vehicle within the environment; and
   output control signals for controlling the vehicle based on the navigation information,
   wherein:
   the plurality of sensors include at least a first vision sensor and a second vision sensor generating image sequences, the one or more predetermined criteria include an image quality based on a number of feature points in the image sequences, a first processor of the one or more processors calculates number of feature points of images in the image sequences generated by the first vision sensor and the second vision sensor;

at least one of the first vision sensor and the second vision sensor is selected in the subset of sensors based on the number of feature points in the images in the image sequences; and a second processor of the one or more processors provides state information based on the images from the images from the selected vision sensor as part of the navigation information.

2. The system of claim 1, wherein the one or more processors are configured to select the subset of sensors based on an assessment of whether sensor data quality of each sensor of said plurality meets the one or more predetermined criteria, wherein:

the selected subset of sensors includes one or more sensors that meets the one or more predetermined criteria, and the one or more predetermined criteria are related to at least one of the orientations, fields of view, data qualities, or power consumptions of the plurality of sensors.

3. The system of claim 1, wherein the one or more processors are further configured to determine state information of the vehicle using the sensor data from the selected subset of sensors without using the sensor data from one or more sensors that are not within the selected subset of sensors.

4. The system of claim 3, wherein the state information comprises at least one of a position, an attitude, a velocity, or an acceleration of the vehicle.

5. The system of claim 3, wherein the one or more processors are further configured to output the control signals to one or more propulsion units of the vehicle for effecting motion of the vehicle, based on the state information of the vehicle and the navigation information.

6. The system of claim 1, wherein an optical axis of the first vision sensor is approximately 90 degrees relative to an optical axis of the second vision sensor.

7. The system of claim 1, wherein the one or more predetermined criteria comprises whether an orientation of each sensor of said plurality of sensors is substantially along a direction of motion of the vehicle.

8. The system of claim 1, wherein the one or more predetermined criteria comprises whether sensor data quality of each sensor of said plurality of sensors exceeds a predetermined threshold, and which of said plurality of sensors has the highest sensor data quality.

9. The system of claim 1, wherein the one or more predetermined criteria comprises whether power consumption of each sensor of said plurality of sensors is below a predetermined threshold, and which of said plurality of sensors has the lowest power consumption.

10. The system of claim 1, wherein the one or more processors are configured to modify a number of sensors in the selected subset based on a direction of motion of the vehicle and/or environmental complexity.

11. A method for navigating a vehicle within an environment, comprising:

with aid of one or more processors individually or collectively:

selecting a subset of sensors from said plurality of sensors to be used for navigating the vehicle within the environment based on one or more predetermined criteria, wherein the plurality of sensors are arranged on the vehicle such that each sensor of said plurality of sensors is configured to obtain sensor data from a different field of view;

processing the sensor data from the selected subset of sensors without processing the sensor data from unselected sensors of the plurality of sensors so as to generate navigation information for navigating the vehicle within the environment; and outputting control signals for controlling the vehicle based on the navigation information, wherein:

the plurality of sensors include at least a first vision sensor and a second vision sensor generating image sequences, the one or more predetermined criteria include an image quality based on a number of feature points in the image sequences, a first processor of the one or more processors calculates number of feature points of images in the image sequences generated by the first vision sensor and the second vision sensor;

at least one of the first vision sensor and the second vision sensor is selected in the subset of sensors based on the number of feature points in the images in the image sequences; and a second processor of the one or more processors provides state information based on the images from the images from the selected vision sensor as part of the navigation information.

12. The method of claim 11, wherein the selecting of the subset of sensors comprises assessing whether sensor data quality of each sensor of said plurality meets the one or more predetermined criteria, and selecting one or more sensors that meets the one or more predetermined criteria to be included in the subset of sensors, wherein the one or more predetermined criteria are related to at least one of the orientations, fields of view, data qualities, or power consumptions of the plurality of sensors.

13. The method of claim 11, further comprising determining state information of the vehicle using the sensor data from the selected subset of sensors without using the sensor data from one or more sensors that are not within the selected subset of sensors.

14. The method of claim 13, wherein the state information comprises at least one of a position, an attitude, a velocity, or an acceleration of the vehicle.

15. The method of claim 13, further comprising outputting the control signals to one or more propulsion units of the vehicle for effecting motion of the vehicle, based on the state information of the vehicle and the navigation information.

16. The method of claim 11, wherein an optical axis of the first vision sensor is approximately 90 degrees relative to an optical axis of the second vision sensor.

17. The method of claim 11, wherein the selecting of the subset of sensors based on the one or more predetermined criteria comprises determining whether an orientation of each sensor of said plurality of sensors is substantially along a direction of motion of the vehicle.

18. The method of claim 11, wherein the selecting of the subset of sensors based on the one or more predetermined criteria comprises determining whether sensor data quality of each sensor of said plurality of sensors exceeds a predetermined threshold, and which of said plurality of sensors has the highest sensor data quality.

19. The method of claim 11, wherein the selecting of the subset of sensors based on the one or more predetermined criteria comprises determining whether power consumption of each sensor of said plurality of sensors is below a predetermined threshold, and which of said plurality of sensors has the lowest power consumption.

20. The method of claim 11, further comprising modifying a number of sensors in the selected subset based on a direction of motion of the vehicle and/or environmental complexity.

\* \* \* \* \*